US007362899B2

(12) United States Patent
Rodyushkin et al.

(10) Patent No.: US 7,362,899 B2
(45) Date of Patent: Apr. 22, 2008

(54) METHODS FOR ESTIMATING THE POSITION AND SHAPE OF LIPS AND FOR ESTIMATING THE POSITION OF TEETH IN A SEQUENCE OF DIGITAL IMAGES OF A HUMAN FACE

(75) Inventors: Konstantin Rodyushkin, Novgorod (RU); Victoria Zhislina, Novgorod (RU)

(73) Assignee: Intel Corporation, Santa Clara ( * ) Notice: Subject to any disclaimer, the term of this patent is extended or adjusted under 35 U.S.C. 154(b) by 762 days.

(21) Appl. No.: 10/800,732

(22) Filed: Mar. 16, 2004

(65) Prior Publication Data
US 2005/0207654 A1 Sep. 22, 2005

(51) Int. Cl.
*G06T 7/60* (2006.01)
(52) U.S. Cl. .............. 382/190; 345/419; 345/473
(58) Field of Classification Search .............. None
See application file for complete search history.

(56) References Cited

U.S. PATENT DOCUMENTS

| | | | | |
|---|---|---|---|---|
| 5,454,043 | A * | 9/1995 | Freeman ................. | 382/168 |
| 6,574,353 | B1 * | 6/2003 | Schoepflin et al. ....... | 382/103 |
| 6,778,252 | B2 * | 8/2004 | Moulton et al. ........... | 352/12 |
| 6,975,750 | B2 * | 12/2005 | Yan et al. ................ | 382/118 |
| 2005/0057569 | A1 * | 3/2005 | Berger ..................... | 345/473 |

OTHER PUBLICATIONS

Kervrann, C et al.., "A Hierarchical Markov Modeling Approach for the Segmentation and Tracking of Deformable Shapes",May 1998,Graphical Models and Image Processing vol. 60, No. 3, pp. 173-195.*

Mirhosseini, A et al., "A hierarchical and Adaptive Deformable Model for Mouth Boundary Detection", IEEE Computer Society, 1997 International Conference on Image processing (ICIP '97)—vol. 2, Oct. 26-29, 1997, pp. 756-759.*

U.S. Appl. No. 10/623,127, filed Jul. 18, 2003, Chudinovich et al.

Alan L. Yuille, P. W. Hallinan, D. S. Cohen, "Feature extraction from faces using deformable templates", International Journal of Computer Vision, vol. 8, N2, pp. 99-111, 1992.

(Continued)

*Primary Examiner*—Vikkram Bali
*Assistant Examiner*—Thomas M Redding
(74) *Attorney, Agent, or Firm*—Pearl Cohen Zedek Latzer, LLP

(57) ABSTRACT

Features of a mouth in a current image of a sequence of digital images of a human face may be estimated by deriving a deformable mouth model template in an iterative process. The process may include minimizing an energy function receiving iteration-dependent arguments to determine optimal transformation parameters of an iteration-dependent transformation, and transforming components of the deformable mouth model template by the iteration-dependent transformation having the optimal transformation parameters. The deformable mouth model template is initialized more than once during the process. The deformable mouth model template may include modeling of teeth.

24 Claims, 15 Drawing Sheets

OTHER PUBLICATIONS

M. Malciu, F. Preteux, "Tracking facial features in video sequences using a deformable model-based approach" Proceedings SPIE Conf. on Mathematical Modeling, Estimation and Imaging, San Diego, CA, vol. 4121, pp. 51-62, 2000.

T.Goto, S.Kshirsagar, N.Magnenat-Thalmann "Real Time Facial Feature Tracking and Speech Acquisition for Cloned Head", IEEE Signal Processing Magazine, vol. 18, No. 3, pp. 17-25., May 2001.

M U Ramos S'anchez, J Matas and J Kittler, "Statistical chromaticity models for lip tracking with B-splines," Proceedings Int. Conf. On Audio- and Video-based Biometric Person Authentication, Crans Montana, Switzerland, 1997.

L. Zhang, "Estimation of the Mouth Features Using Deformable Template Matching", Int. Conf. on Image Processing, Oct. 26-29, 1997, p. 328.

* cited by examiner

METHODS FOR ESTIMATING THE POSITION AND SHAPE OF LIPS AND FOR ESTIMATING THE POSITION OF TEETH IN A SEQUENCE OF DIGITAL IMAGES OF A HUMAN FACE

BACKGROUND OF THE INVENTION

A sequence of digital images, such as, for example, a sequence of video frames of a talking person, may include images of a human face. In various computerized applications, it may be desirable to estimate features of the mouth, such as, for example, the location and shape of the lips in images of that sequence. Deformable mouth model templates may be used for that purpose.

A deformable mouth model template is a model approximating the location and shape of a mouth. For the deformable mouth model template to estimate the shape and location of the mouth for a given image of a human face, an energy objective function may be minimized.

The quality, accuracy and robustness of the estimation of mouth features may depend on the structure of the deformable mouth model template used, and/or on the energy objective function used, and/or on the minimization algorithm used.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
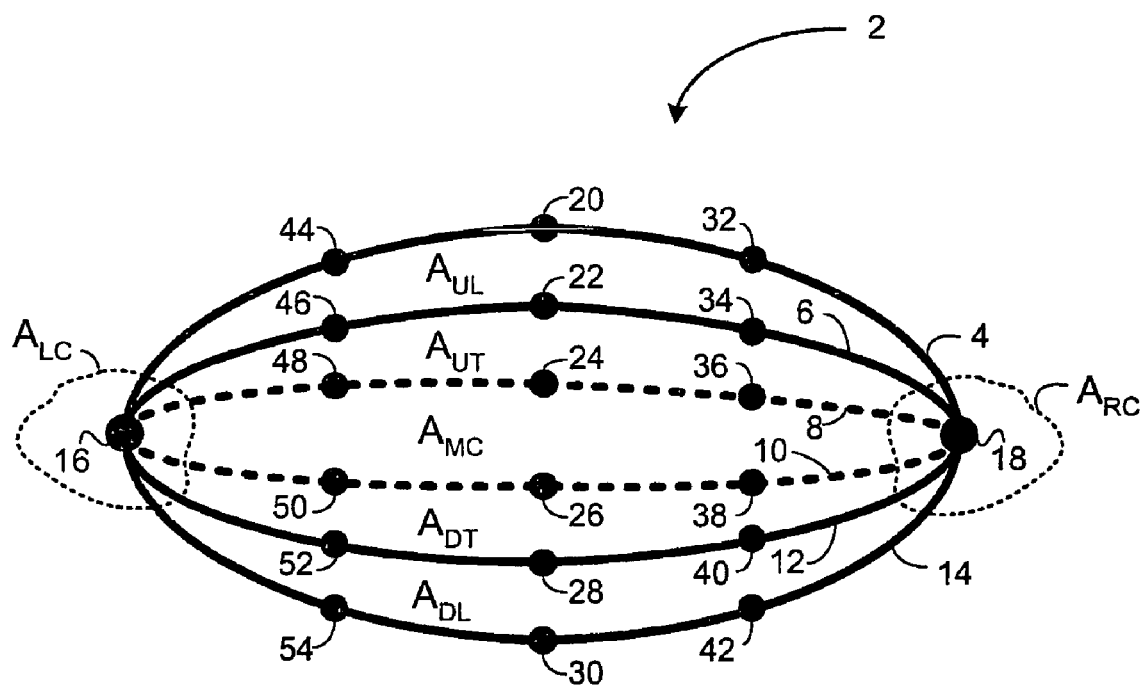
FIG. 1 is an illustration of a deformable mouth model template, according to some embodiments of the invention.

FIG. 1 is an illustration of a deformable mouth model template 2 of a mouth, according to some embodiments of the invention.

Deformable mouth model template 2 may comprise lip contours 4, 6, 12 and 14, and may optionally comprise teeth contours 8 and 10. In addition, deformable mouth model template 2 may comprise a left corner control point 16 (denoted "point_left" (P_L)) and a right corner control point 18 (denoted "point_right" (P_R)) that represent the left and right corners of the mouth, respectively.

The following table lists the contours, what they represent, and how they are denoted hereinbelow.

TABLE 1

| Contour | Represents | Denoted |
|---|---|---|
| 4 | upper boundary of upper lip | contour_up_up (C_UU) |
| 6 | lower boundary of upper lip | contour_up_down (C_UD) |
| 8 | lower boundary of upper teeth | contour_teeth_up (C_TU) |
| 10 | upper boundary of lower teeth | contour_teeth_down (C_TD) |
| 12 | upper boundary of the lower lip | contour_down_up (C_DU) |
| 14 | lower boundary of the lower lip | contour_down_down (C_DD) |

It is assumed that the upper boundary of the upper teeth coincides with the lower boundary of the upper lip, and that the lower boundary of the lower teeth coincides with the upper boundary of the lower lip.

Control points 16 and 18 are common points of contours 4, 6, 8, 10, 12 and 14.

Deformable mouth model template 2 may comprise control points 20, 22, 28 and 30, located substantially on the centers of lip contours 4, 6, 12 and 14, respectively. In addition, deformable mouth model template 2 may optionally comprise control points 24 and 26, located substantially on the centers of teeth contours 8 and 10, respectively. The locations of control points 20, 22, 24, 26, 28 and 30 substantially on the centers of the respective contours are denoted "point_center" (P_C).

Deformable mouth model template 2 may comprise control points 32, 34, 40 and 42, located on lip contours 4, 6, 12 and 14, respectively, between control point 18 and the respective P_C. In addition, deformable mouth model template 2 may comprise control points 36 and 38, located on teeth contours 8 and 10, respectively, between control point 18 and the respective P_C. Although the present invention is not limited in this respect, control points 32, 34, 36, 38, 40 and 42 may be located on contours 4, 6, 8, 10, 12 and 14, respectively, substantially quarter of the length of the respective contour from control point 18. The locations of control points 32, 34, 36, 38, 40 and 42 on the respective contours are denoted "point_right_center" (P_RC).

Similarly, deformable mouth model template 2 may comprise control points 44, 46, 52 and 54 located on lip contours 4, 6, 12 and 14, respectively, between control point 16 and the respective P_C. In addition, deformable mouth model template 2 may comprise control points 48 and 50, located on teeth contours 8 and 10, respectively, between control point 16 and the respective P_C. Although the present invention is not limited in this respect, control points 44, 46, 48, 50, 52 and 54 may be located on contours 4, 6, 8, 10, 12 and 14, respectively, substantially quarter of the length of the respective contour from point 16. The locations of control points 44, 46, 48, 50, 52 and 54 on the respective contours are denoted "point_left_center" (P_LC).

The following table lists the control points of the mouth model template, what they represent, and how they are denoted hereinbelow.

TABLE 2

| Control Point | Represents | Denoted |
| --- | --- | --- |
| 16 | left corner of mouth | P_L |
| 18 | right corner of mouth | P_R |
| 20, 22, 24, 26, 28 and 30 | point at center of contour | P_C |
| 32, 34, 36, 38, 40 and 42 | point on contour between P_C and P_R | P_RC |
| 44, 46, 48, 50, 52 and 54 | point on contour between P_C and P_L | P_LC |

The shapes of the contours between control points may be calculated using conventional cubic splines. The Y coordinates of all the control points and the X coordinates of P_L and P_R are freely determinable, while the X coordinates of the P_LC, P_C and P_RC control points are determined based upon their relative position to mouth corners (¼, ½, and ¾).

The following table lists areas of the mouth model template, and how they are denoted hereinbelow.

TABLE 3

| Area Denoted | Meaning |
| --- | --- |
| $A_{UL}$ | upper lip (area enclosed by lip contours C_UU and C_UD) |
| $A_{UT}$ | upper teeth (area enclosed by contours C_UD and C_TU) |
| $A_{MC}$ | mouth cavity (area enclosed by teeth contours C_TU and C_TD) |
| $A_{DT}$ | lower teeth (area enclosed by contours C_TD and C_DU) |
| $A_{DL}$ | lower lip (area enclosed by lip contours C_DU and C_DD) |
| $A_{LC}$ | left corner of mouth (area surrounding control point P_L) |
| $A_{RC}$ | right corner of mouth (area surrounding control point P_R) |

Alternatively, the area enclosed by lip contours C_UD and C_DU may be denoted "$A_{UT+MC+DT}$".

Figure 2:
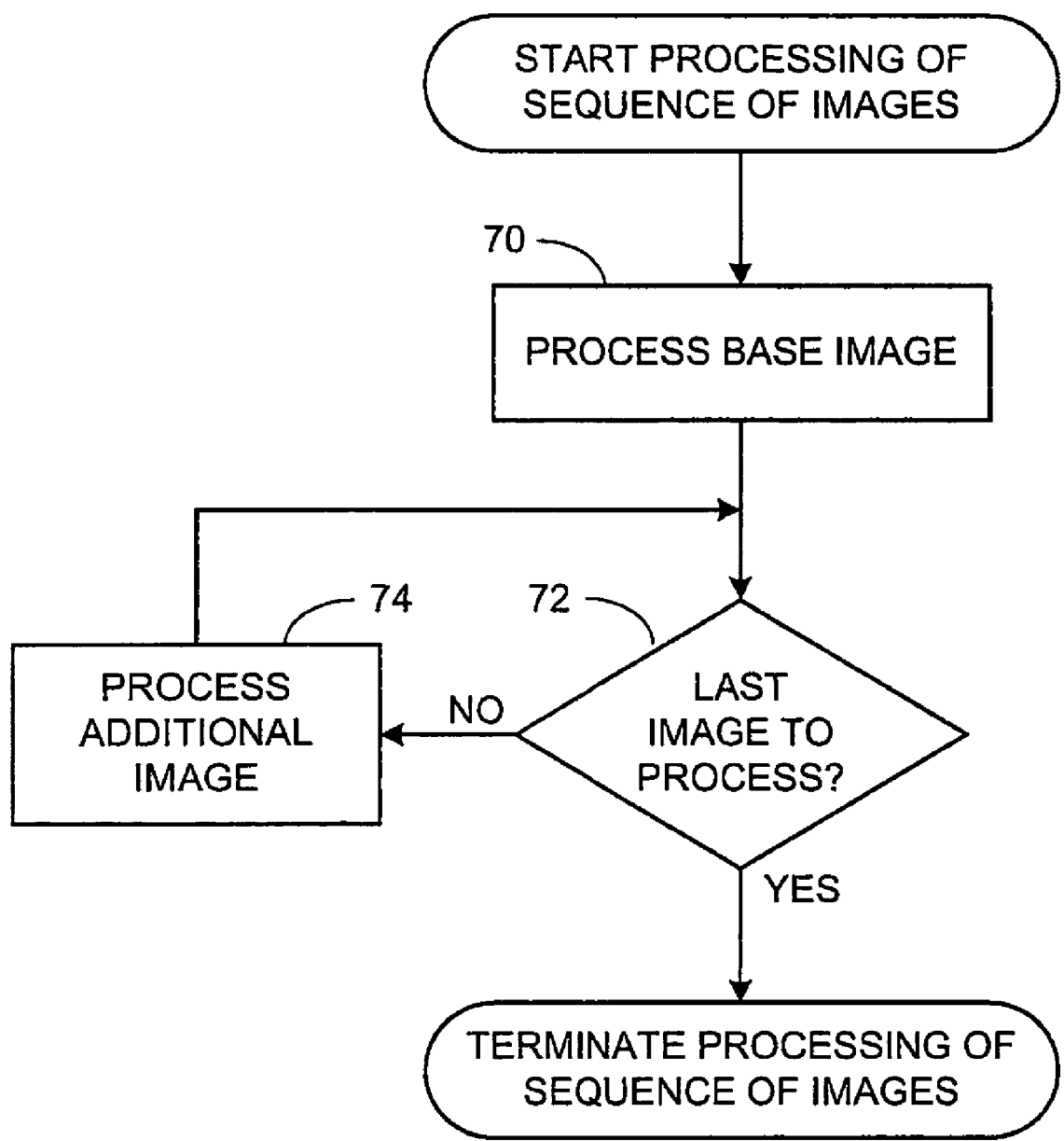
FIG. 2 is a flowchart of an exemplary method for estimating the position and shape of lips and for optionally estimating the position of teeth in one of a sequence of digital images of a human face, according to some embodiments of the invention.

FIG. 2 is a flowchart illustration of an exemplary method for processing a sequence of digital images of a human face, according to some embodiments of the invention. The method of FIG. 2 may be implemented in any of a variety of applications, such as, for example, computer vision, image understanding, object detection, human-machine interfaces, automated visual surveillance, face detection/recognition, communication, lip synching, synthetic video, education and games.

Processing the sequence of digital images may begin with processing of a single digital image of the sequence, referred to as "the base image" (70). If there is an additional digital image to be processed (72), then the additional digital image is processed (74). If not, then processing of the sequence is terminated.

Processing the base image may include a method of initializing a deformable mouth model template based on the image of a mouth in the base image. An example of such a method is described hereinbelow with respect to FIG. 3. Processing the additional image may include a method of estimating the position and shape of lips and optionally the position of teeth of a mouth in the additional image. An example of such a method is described hereinbelow with respect to FIG. 4.

Figure 3:
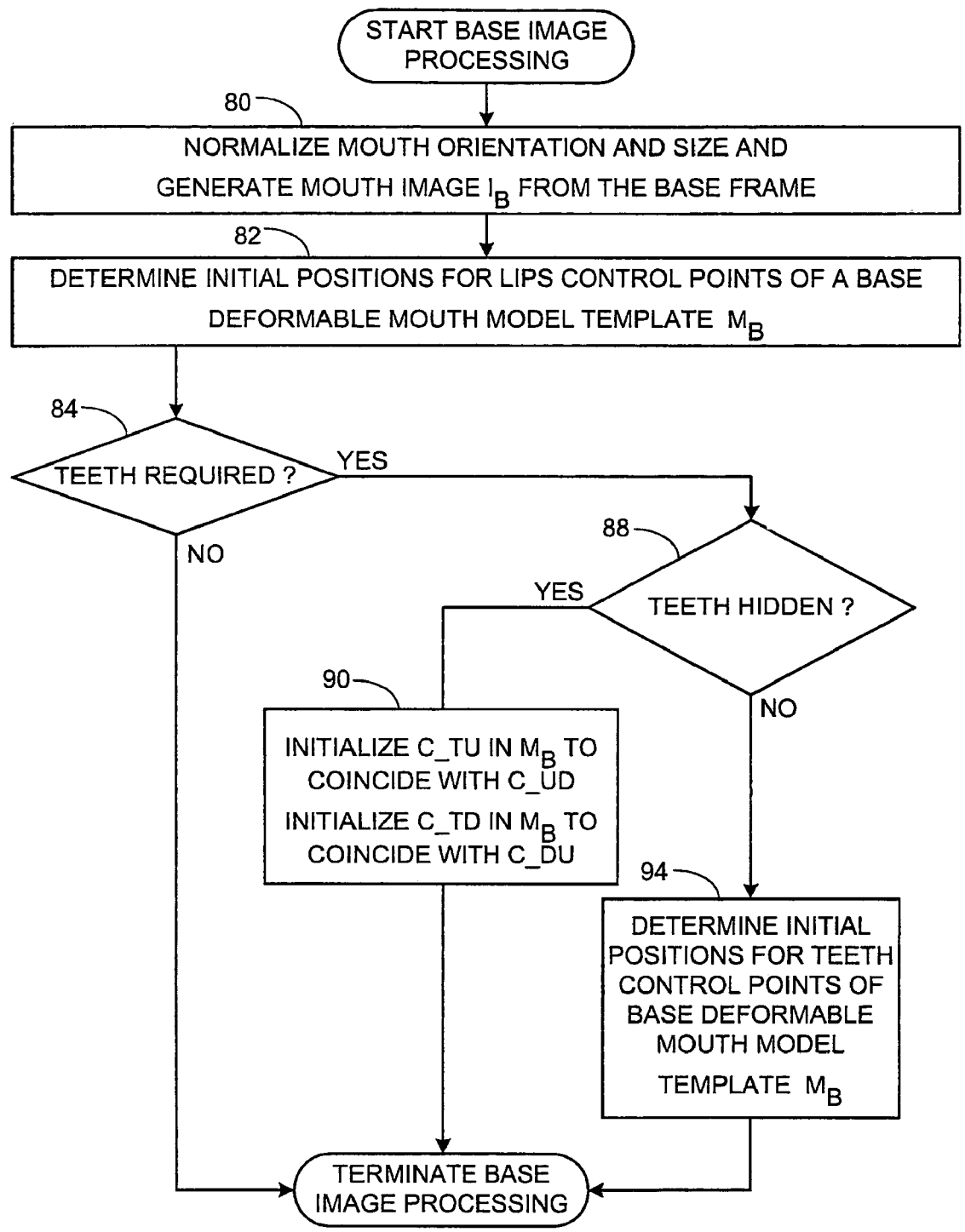
FIG. 3 is a flowchart illustration of an exemplary method for initializing a deformable mouth model template from a mouth image in a base image, according to some embodiments of the invention.

FIG. 3 is a flowchart illustration of an exemplary method for initializing a deformable mouth model template from a mouth image in a base image according to some embodiments of the invention. For example, a deformable mouth model template is initialized once pixel coordinate values have been given to the contours and control points of the template.

The mouth area in the base image may be copied into a new image—denoted mouth image "$I_B$"—having a fixed size, for example, a width "W" of 128 pixels and a height "H" of 128 pixels. The mouth area in the base image may be scaled and rotated to fit to the size W*H of mouth image $I_B$. A mouth in a neutral position, e.g. not stretched and not squeezed, may have a width of, for example, W/2 in mouth image $I_B$ (80).

Lip contours 4, 6, 12 and 14 and control points 16, 18, 20, 22, 28, 30, 32, 34, 40, 42, 44, 46, 52 and 54 of a deformable mouth model template $M_B$ may be initialized by a known or future, automatic or manual initialization method (82).

If an estimation of the position of the teeth in the sequence of images is not required (84), the processing of the base image is terminated. Otherwise, if the teeth are hidden (88), teeth contours 8 and 10 may be initialized to coincide with lip contours 6 and 12, respectively, and control points 36, 24 and 48, and 38, 26 and 50 may be initialized to coincide with control points 34, 22 and 46, and 40, 28 and 54 respectively (90).

However, if the teeth are not hidden, teeth contours 8 and 10 and control points 24, 26, 36, 38, 48 and 50 of the deformable mouth model template $M_B$ may be initialized by a known or future, automatic or manual initialization method (94).

In the following description, an image being processed in (74) is referred to as a "current" image. In addition, during the processing of a current image, information from a second image may be used, such as for example, the estimated position and shape of the lips and the estimated position of the teeth of the second image. In the following description, that second image is referred to as a "previously processed" image.

However, the term "previously processed" is not intended to imply a temporal, sequential or spatial relationship between the two images. It is possible that the previously processed image occurs earlier in the sequence than the current image. It is also possible that the previously processed image occurs later in the sequence than the current image. Moreover, it is possible that the previously processed image and the current image are not consecutive in the sequence.

Figure 4:
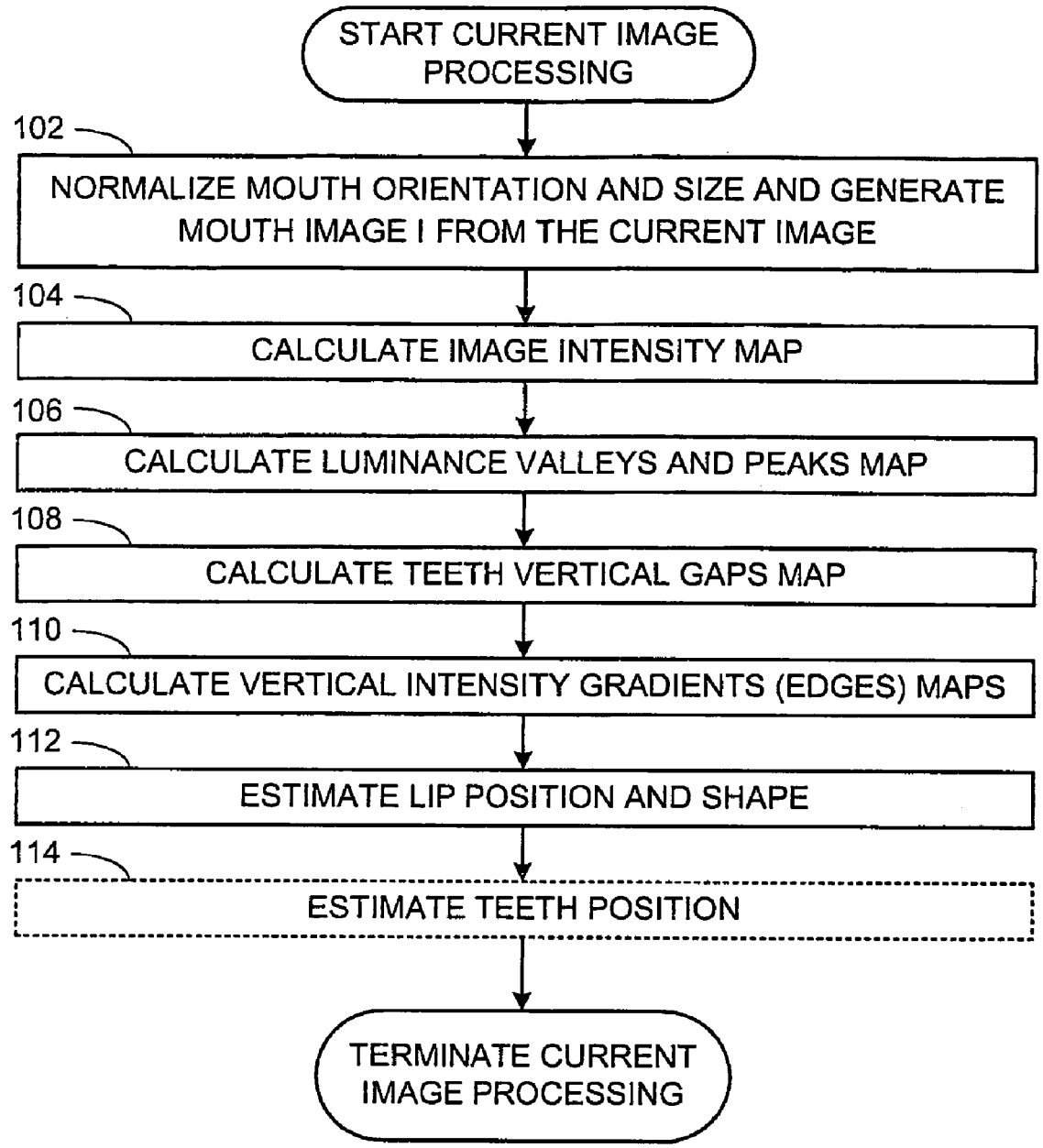
FIG. 4 is a flowchart illustration of an exemplary method for deriving a deformable mouth model template of a mouth in one of a sequence of digital images of a human face, according to some embodiments of the invention.

FIG. 4 is a flowchart illustration of an exemplary method for deriving a deformable mouth model template of a mouth in one of a sequence of images of a human face, according to some embodiments of the invention.

The mouth area may be copied into a new image—denoted mouth image "I"—having a fixed width W and a fixed height H. The mouth area may be scaled and rotated to fit the size W*H of mouth image "I" (102). An image intensity map I(x,y) may be calculated by known or future methods (104), and a spatial luminance peaks and valleys map $I^{PEAK-VALLEY}(x,y)$ may be calculated by known or future methods (106). A teeth vertical gaps map $I^{TG}(x,y)$ may be calculated (108), according to the following equations:

$$I^{TG}(x, y) = 1(V) \cdot V \quad (1)$$

$$V = (I(x-d, y) + I(x+d, y) - 2I(x, y) - I_{THRESHOLD}) \quad (2)$$

$$1(t) = \begin{cases} 0, & t \le 0, \\ 1, & t > 0. \end{cases} \quad (3)$$

where in equation (2), "d" is an image difference step and may have a value of several pixels, for example, 2, and $I_{THRESHOLD}$ may be an empirical threshold for the teeth area, with a value, for example, of approximately 30 (on the assumption that pixel intensity values range from 0 to 255), and the function "1" is defined in equation (3) as having the value zero when its argument is less than or equal to zero and as having the value one otherwise.

A vertical edges map $I^{V-EDGE}(x,y)$ of the vertical intensity gradient may be used in estimating the position and shape of the lips in an image of a sequence of images of a human face. Vertical edges map $I^{V-EDGE}(x,y)$ may be calculated by known or future methods (110), for example, as described in the following equation:

$$I^{V-EDGE}(x, y) = \left| \frac{I(x, y+1) - I(x, y-1)}{2} \right| \quad (4)$$

The position and shape of the lips are estimated (112) using, for example, the methods shown hereinbelow in FIGS. 8, 9 and 10. Optionally, the position of the teeth is estimated (114) using, for example, the methods shown hereinbelow in FIGS. 11 and 12.

Estimating the Position and Shape of the Lips

Figure 5:
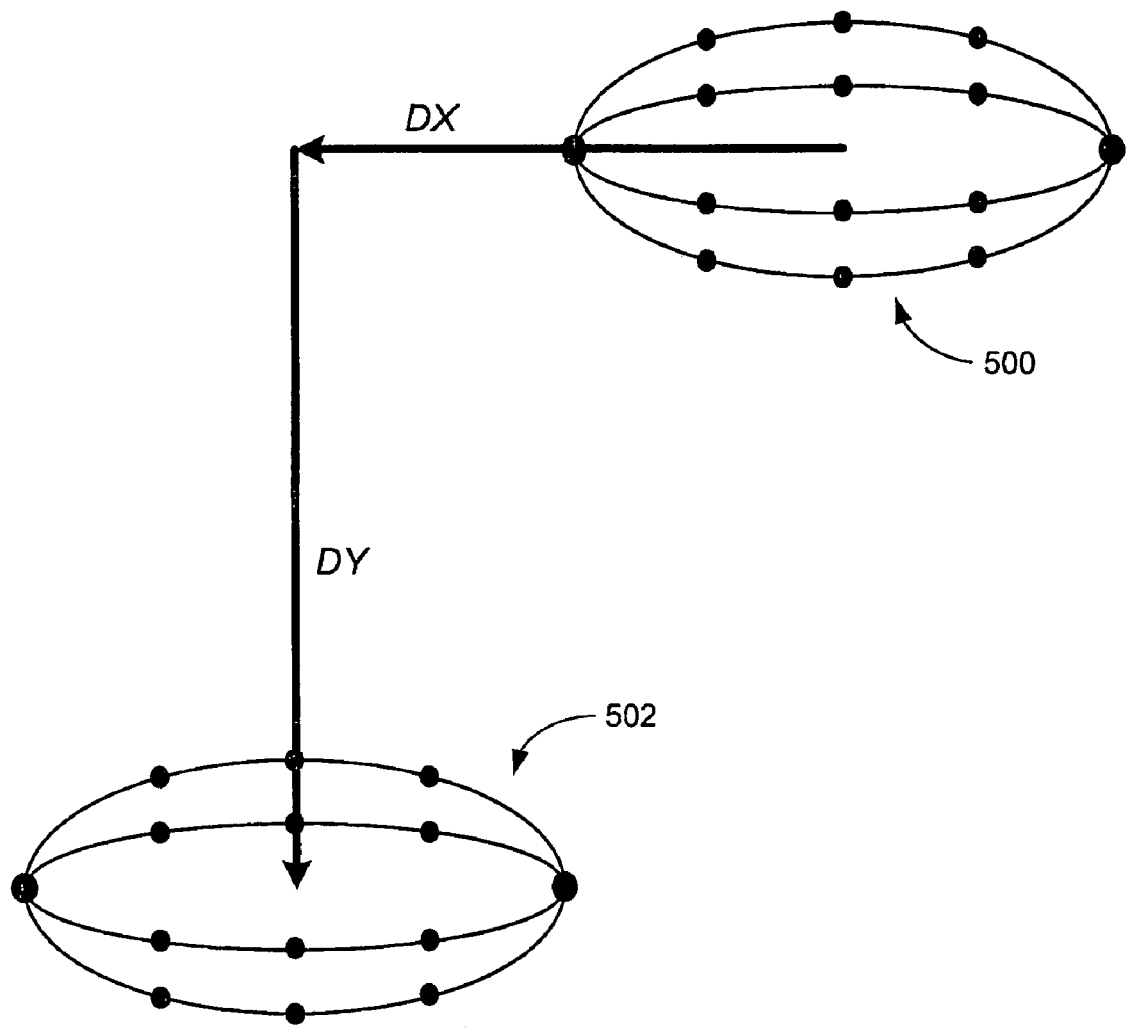
FIG. 5 is an illustration of an exemplary second-level lip transformation, according to some embodiments of the invention.

The position and shape of the lips are estimated in an iterative process using three different types of transformations. A "second-level lip transformation" $T_{2L}(DX, DY)$ is a coarse transformation used once to transform the location of a deformable mouth model template of a previously processed image to a location generally reflecting the location of the mouth in the current image. Briefly, FIG. 5 illustrates an exemplary second-level lip transformation on a deformable mouth model template, with contours C_TU and C_TD omitted for clarity. Template 500 is the template prior to the transformation, and template 502 is the template after the transformation. DX and DY are relative displacements of the center of the deformable mouth model template along perpendicular axes X and Y, respectively, as summarized below in Table 4. In the second-level lip transformation, the locations of the control points of the lip contours C_UU, C_UD, C_DU and C_DD are transformed in unison, as shown in Table 5, which is explained in detail hereinbelow.

Figure 6:
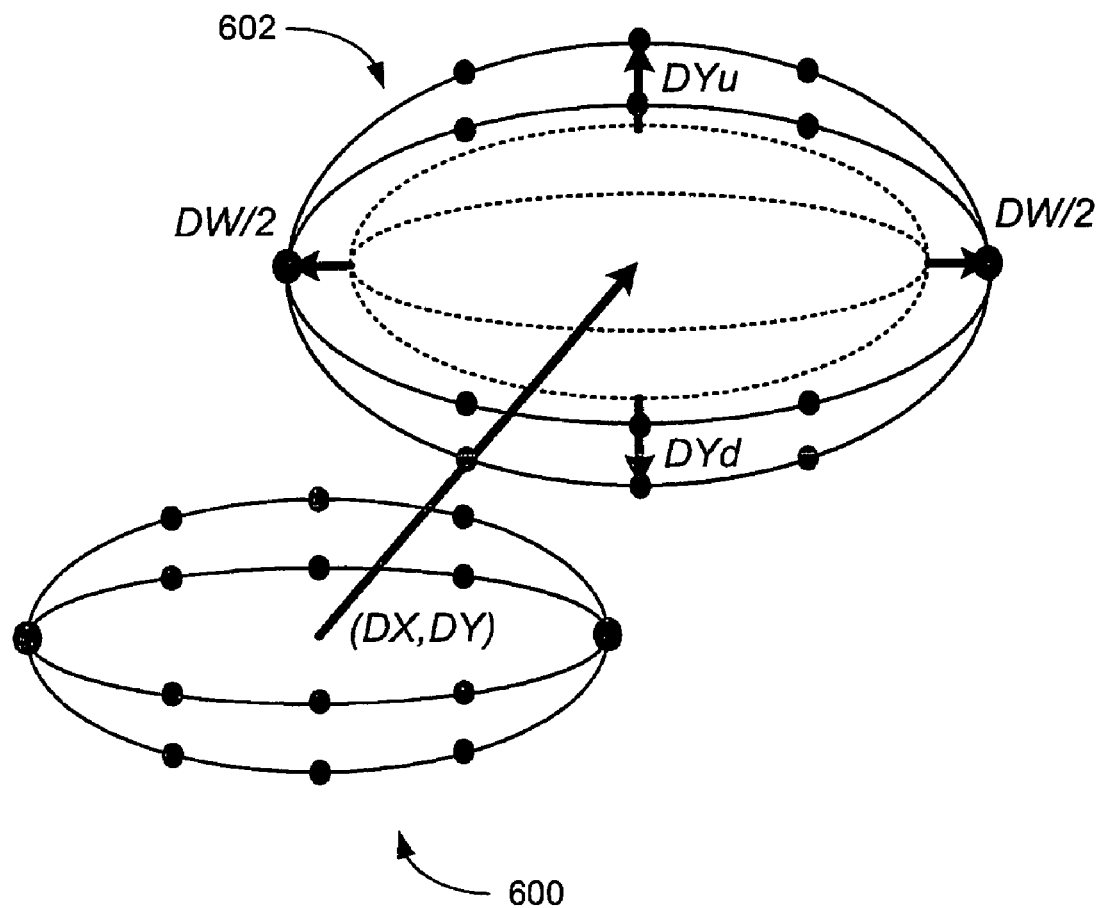
FIG. 6 is an illustration of an exemplary first-level lip transformation, according to some embodiments of the invention.

A "first-level lip transformation" $T_{1L}(DX, DY, DYu, DYd, DW)$ is a fine transformation used to refine the estimated location of the mouth and to generally estimate the opening and stretching of the mouth. Briefly, FIG. 6 illustrates an exemplary first-level lip transformation on a deformable mouth model template, with contours C_TU and C_TD omitted for clarity. Template 600 is the template prior to the transformation, and template 602 is the template after the transformation. As before, DX and DY are relative displacements of the center of the deformable mouth model template along perpendicular axes X and Y, respectively. A dashed template illustrates the displacement from template 600. DW is a difference in the mouth stretching, DYu is the difference in the location of the upper lip relative to the center of the mouth, and DYd is the difference in the location of the lower lip relative to the center of the mouth, as summarized below in Table 4. In the first-level lip transformation, the locations of the control points of contours C_UU and C_UD are transformed in unison, and the locations of the control points of contours C_DU and C_DD are transformed in unison, as shown in Table 5, which is explained in detail hereinbelow.

Figure 7:
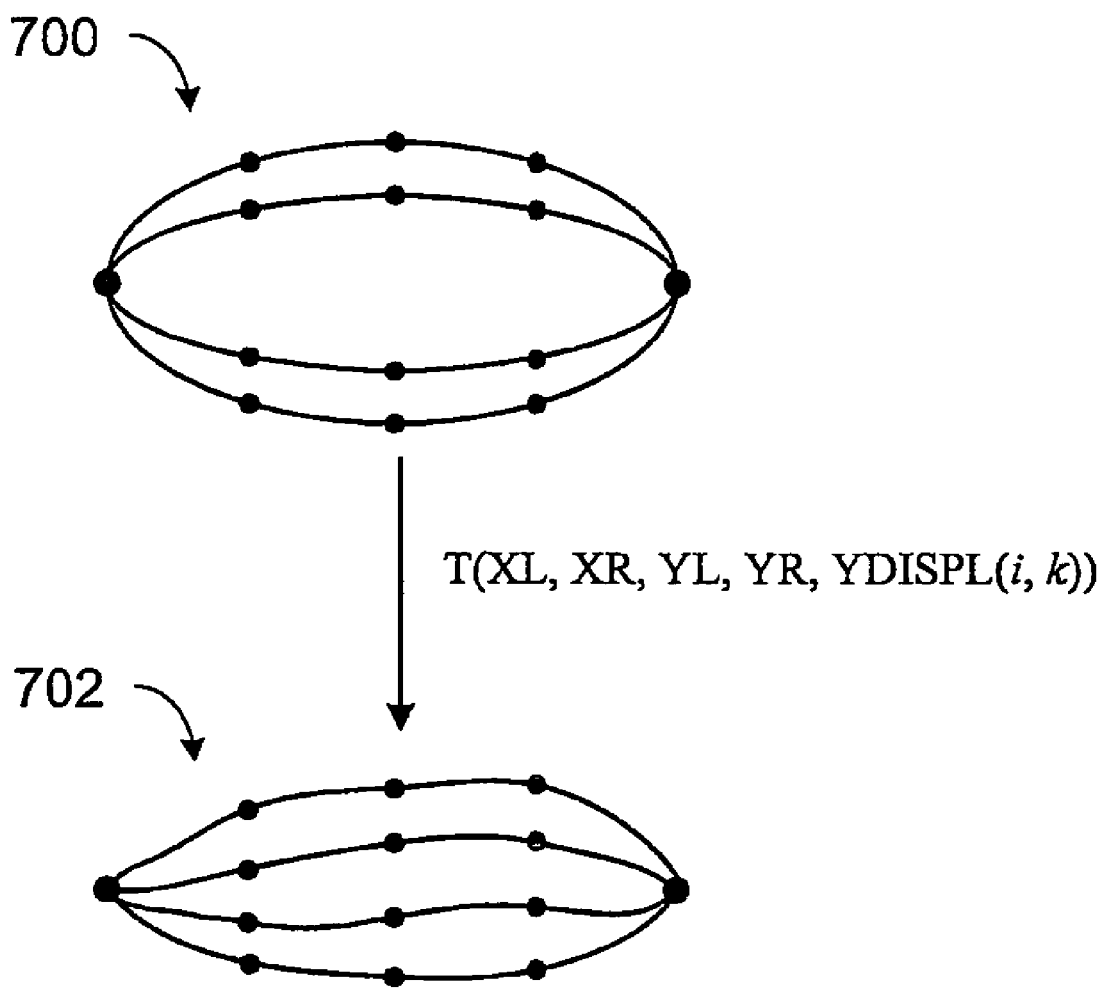
FIG. 7 is an illustration of an exemplary zero-level lip transformation, according to some embodiments of the invention.

A "zero-level lip transformation" $T_{0L}(XL, XR, YL, YR, YDISPL(i,k))$ is a superfine transformation used to refine the estimated location of individual lip control points of the deformable mouth model template. Briefly, FIG. 7 illustrates an exemplary zero-level lip transformation on a deformable mouth model template, with contours C_TU and C_TD omitted for clarity. Template 700 is the template prior to the transformation, and template 702 is the template after the transformation (displaced relative to template 700 only for clarity). XL and YL describe the relative horizontal and vertical displacements, respectively, of control point P_L. Similarly, XR and YR describe the relative horizontal and vertical displacements, respectively, of control point P_R. YDISPL(i,k) describe the vertical displacements of each of the lip control points 20, 22, 28, 30, 32, 34, 40, 42, 44, 46, 52 and 54. These transformation parameters are summarized below in Table 4. In the zero-level lip transformation, the locations of the control points of contours C_UU, C_UD, C_DU and C_DD are individually transformed, as shown in Table 5, which is explained in detail hereinbelow.

The first-level and zero-level lip transformations may be used several times in a defined order to refine the estimation of the position and shape of the lips.

It should be understood that in alternative embodiments of the invention, a different number of lip transformation types may be used. Moreover, it should be understood that in alternative embodiments of the invention, lip transformation types may be used a different number of times and in a different order or in no specific order.

Figure 8:
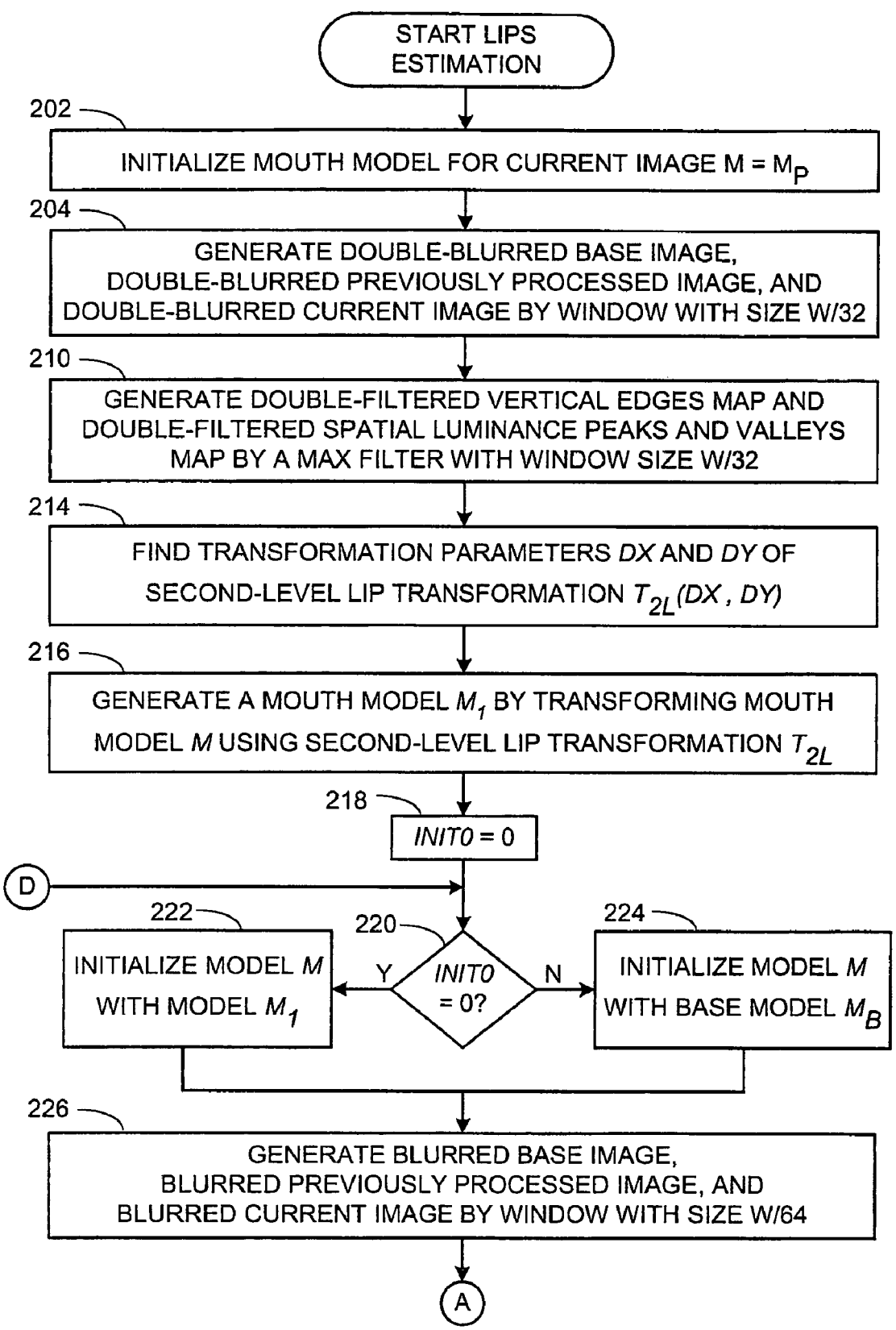
FIGS. 8-10 are a flowchart illustration of an exemplary method for estimating the position and shape of lips in one of a sequence of digital images of a human face, according to some embodiments of the invention.
Figure 9:
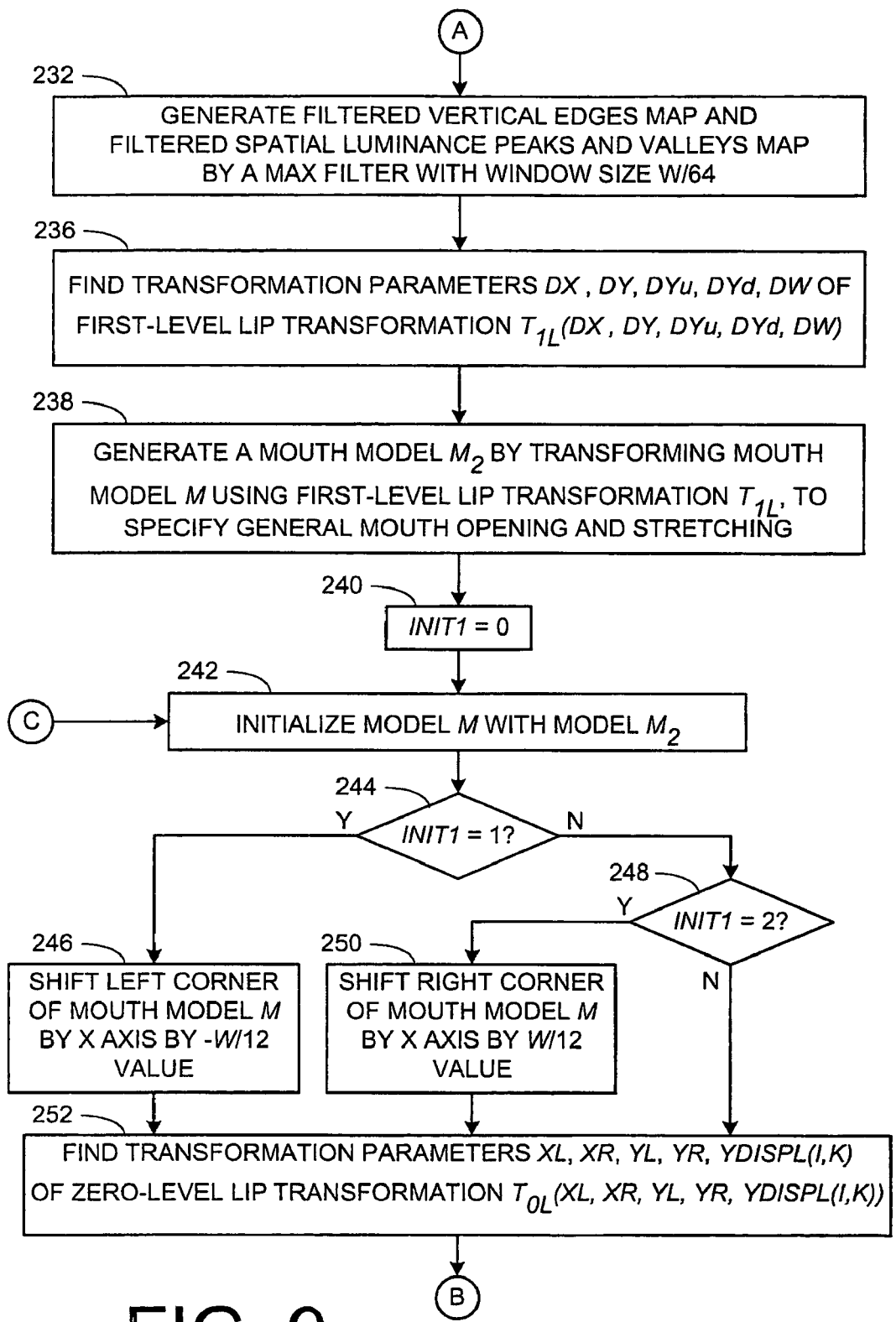
Figure 10:
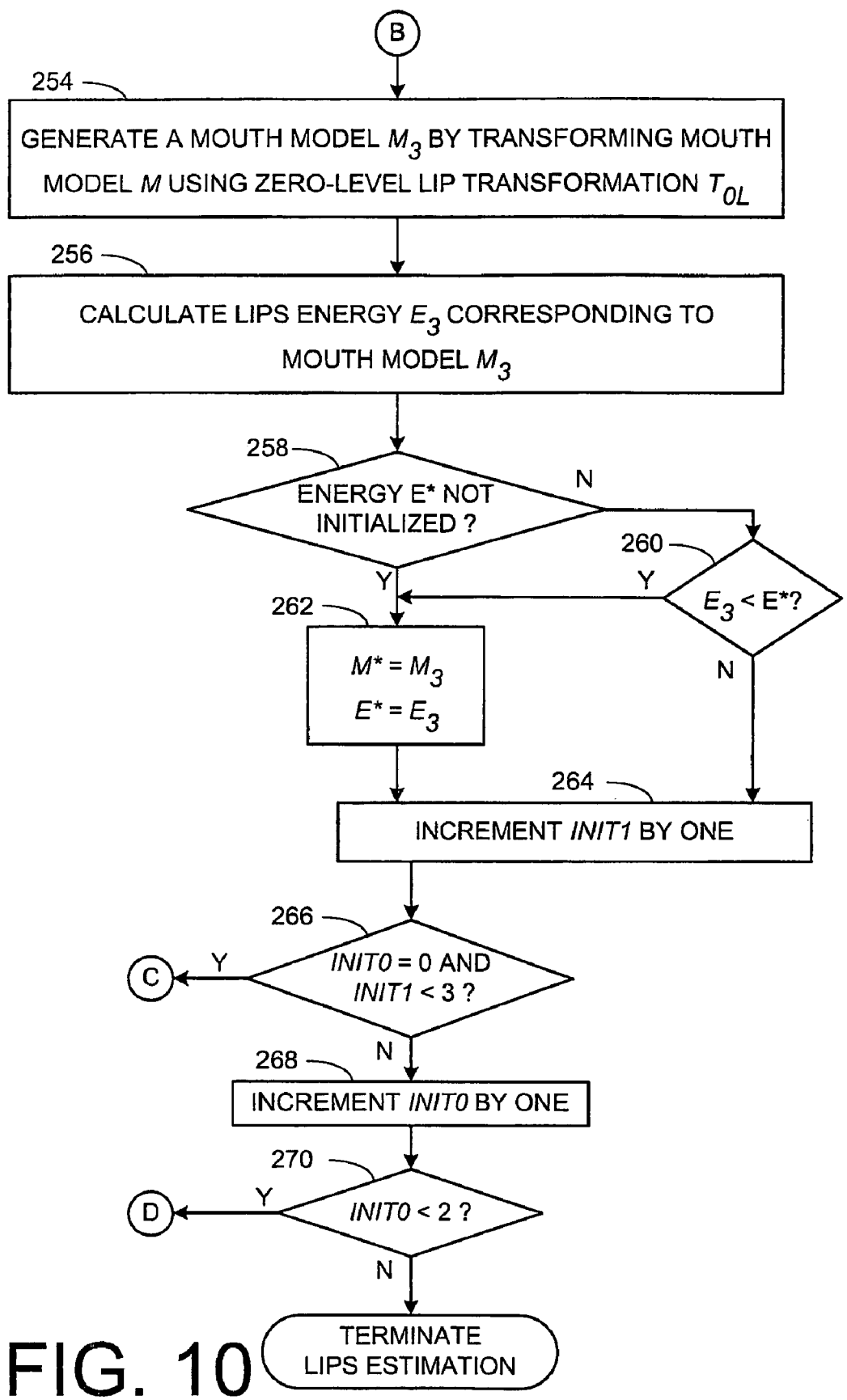

FIGS. 8, 9 and 10 are a flowchart illustration of an exemplary method for estimating the position and shape of lips in one of a sequence of images of a human face, according to some embodiments of the invention.

Referring to FIG. 8, a deformable mouth model template M for the current image is initialized to be equal to a deformable mouth model template $M_P$ of a previously processed image (202).

Mouth image $I_B$ of the base image, mouth image $I_P$ of the previously processed image, and mouth image I of the current image are blurred with a W/32 window using known or future methods to generate a "double-blurred mouth image $I_B$", a "double-blurred mouth image $I_P$", and a "double-blurred mouth image I", respectively (204).

An exemplary blurring method to be used in (204) is presented in the following equation:

$$B[I(x, y), w] = \frac{1}{w*w} \sum_{i=-w/2}^{w/2} \sum_{j=-w/2}^{w/2} I(x+i, y+j) \qquad (6)$$

where w is the size of the window. However, mouth images $I_B$, $I_P$, and I need not be blurred by the same method, nor need they be blurred in any particular order.

"Double-blurring" using a window size of W/32 of an exemplary mouth image I(x,y) using equation (6) is demonstrated in the following equation:

$$\text{Double-Blurred } I(x, y) = B\left[I(x, y), \frac{W}{32}\right] \qquad (7)$$

Vertical edges map $I^{V-EDGE}(x,y)$ and the spatial luminance peaks and valleys map $I^{PEAK-VALLEY}(x,y)$ are filtered using known or future methods, for example, a "MAX" filter (also known as a "dilate morphological operator") with a W/32 window, to generate a "double-filtered vertical edges map" and a "double-filtered spatial luminance peaks and valleys map", respectively (210).

An exemplary "MAX" filtering method to be used in (210) is presented in the following equation:

$$\text{MAX}[I(x, y), w] = \max_{-\frac{w}{2} \le i \le \frac{w}{2}, -\frac{w}{2} \le j \le \frac{w}{2}} I(x+i, y+j) \qquad (8)$$

where w is the size of the window. However, maps $I^{V-EDGE}(x,y)$ and $I^{PEAK-VALLEY}(x,y)$ need not be filtered by the same method, nor need they be filtered in any particular order.

"Double-filtering" using a window size of W/32 of an exemplary mouth image I(x,y) using equation (8) is demonstrated in the following equation:

$$\text{Double-Filtered } I(x, y) = \text{MAX}\left[I(x, y), \frac{W}{32}\right] \qquad (9)$$

Transformation parameters DX and DY for a second-level lip transformation $T_{2L}(DX, DY)$ are determined by minimizing a lips energy objective function $E^L$, which is defined in equation (21) and calculated using double-blurred mouth images $I_B$, $I_P$, and I, the double-filtered spatial luminance peaks and valleys map and the double-filtered vertical edges map (214).

Determining parameters DX and DY is demonstrated in the following equation and may be achieved using known or future methods, such as, for example, gradient descent, downhill-simplex, and the like.

$$DX, DY = \arg\min_{DX,DY} E^L(T_{2L}(DX, DY), I) \qquad (10)$$

A deformable mouth model template $M_1$ is generated (216) by transforming deformable mouth model template M using $T_{2L}(DX, DY)$, and a variable denoted "init0", serving as a loop counter, is initialized to the value zero (218).

If variable init0 is equal to zero (220), deformable mouth model template M is initialized with deformable mouth model template $M_1$ (222), else, deformable mouth model template M is initialized with deformable mouth model template $M_B$ (224).

Mouth image $I_B$ of the base image, mouth image $I_P$ of the previously processed image, and mouth image I of the current image are blurred with a W/64 window using, for example, equation (6), to generate a "blurred mouth image $I_B$", a "blurred mouth image $I_P$", and a "blurred mouth image I", respectively (226), as shown in the following equations:

$$\text{Blurred } I_B(x, y) = B\left[I_B(x, y), \frac{W}{64}\right] \qquad (11)$$

$$\text{Blurred } I_P(x, y) = B\left[I_P(x, y), \frac{W}{64}\right] \qquad (12)$$

$$\text{Blurred } I(x, y) = B\left[I(x, y), \frac{W}{64}\right] \qquad (13)$$

Referring now to FIG. 9, vertical edges map $I^{V-EDGE}(x,y)$ and the spatial luminance peaks and valleys map $I^{PEAK-VALLEY}(x,y)$ are filtered using known or future methods, for example, the "MAX" filter presented in equation (8) with a W/64 window, to generate a "filtered vertical edges map" and a "filtered spatial luminance peaks and valleys map", respectively (232).

Transformation parameters DX, DY, DYu, DYd and DW of first-level lip transformation $T_{1L}(DX, DY, DYu, DYd, DW)$ are determined by minimizing lips energy objective function $E^L$, which is defined in equation (21) and calculated using blurred mouth images $I_B$, $I_P$, and I, the filtered spatial luminance peaks and valleys map and the filtered vertical edges map (236). Determining parameters DX, DY, DYu, DYd and DW is demonstrated in the following equation and can be obtained using known or future methods, such as, for example, gradient descent, downhill-simplex, and the like.

$$\begin{aligned} DX, DY, DYu, DYd, DW = \\ \arg\min_{DX,DY,DYu,DYd,DW} E^L(T_{1L}(DX, DY, DYu, DYd, DW), I) \end{aligned} \qquad (14)$$

A deformable mouth model template $M_2$ for the current image is generated (238) by transforming deformable mouth model template M using first-level lip transformation $T_{1L}(DX, DY, DYu, DYd, DW)$.

A variable denoted "init1", serving as a loop counter, is initialized to the value zero (240). Deformable mouth model template M is initialized with deformable mouth model template $M_2$ (242).

If variable init1 equals 1 (244), control point 16 of deformable mouth model template M is shifted left on the "X" axis by W/12 (246). If variable init1 equals 2 (248), control point 18 of deformable mouth model template M is shifted right on the "X" axis by W/12 (250).

Transformation parameters XL, XR, YL, YR and YDISPL(i,k) of a zero-level lip transformation $T_{0L}(XL, XR, YL, YR, YDISPL(i,k))$ are determined by minimizing lips energy objective function $E^L$, defined in equation (21) and calculated using mouth images $I_B$, $I_P$, and I, the spatial luminance peaks and valleys map and vertical edges map (252).

Determining parameters XL, XR, YL, YR and YDISPL (i,k) is demonstrated in the following equation and can be obtained using known or future methods, such as, for example, gradient descent, downhill-simplex, and the like.

$$XL, XR, YL, YR, YDISPL(i, k) = \arg\min_{XL,XR,YL,YR,YDISPL(i,k)} E^L(T_{0L}(XL, XR, YL, YR, YDISPL(i, k)), I) \quad (15)$$

Referring now to FIG. 10, a deformable mouth model template $M_3$ for the current image is generated (254) by transforming deformable mouth model template M using zero-level lip transformation $T_{0L}$(XL, XR, YL, YR, YDISPL (i,k)).

Energy $E_3$, corresponding to deformable mouth model template $M_3$, is calculated using contour and control point values of deformable mouth model template $M_3$ in the equation for lips energy objective function $E^L$ (256).

The minimum energy of lips energy objective function $E^L$ once the lips estimation procedure is completed may be denoted E*. In addition, the final deformable mouth model template once the lips estimation procedure is completed may be denoted M*.

If energy E* is not initialized (258) or if energy $E_3$ is less than E* (260), deformable mouth model template M* is set equal to deformable mouth model template $M_3$ and E* is set equal to energy $E_3$ (262).

Variable init1 is incremented by one (264).

If the value of variable init1 is smaller than 3 (266), the method continues from block (242) at FIG. 9. Otherwise, variable init0 is incremented by one (268).

If the value of variable init0 is smaller than 2 (270), the method continues from block (220) at FIG. 8. Otherwise, the method is terminated.

Estimating the Position and Shape of the Teeth

Figure 11:
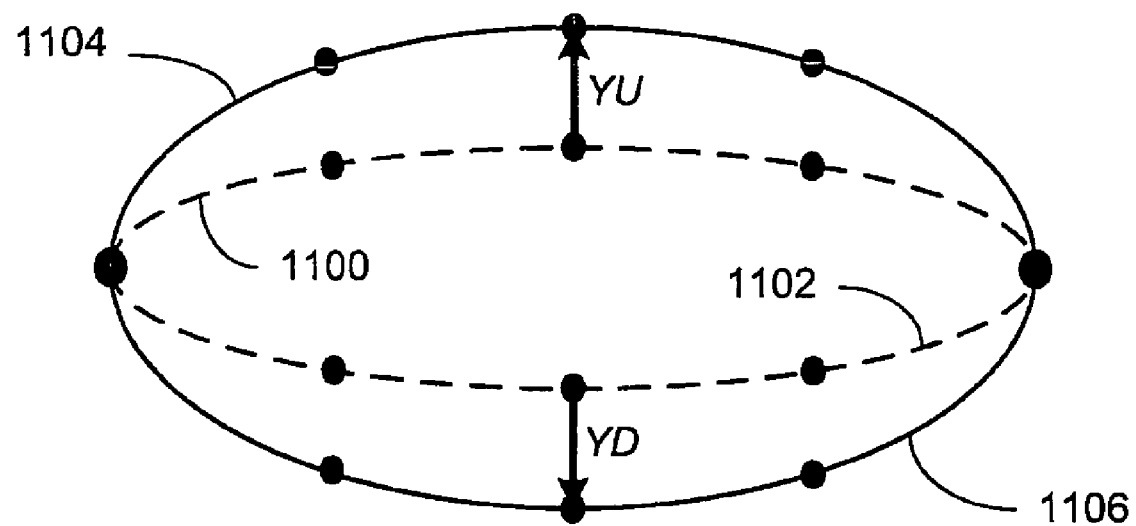
FIG. 11 is an illustration of an exemplary first-level teeth transformation, according to some embodiments of the invention.

The teeth positions are estimated in an iterative process using two different types of transformations. A "first-level teeth transformation" $T_{1T}$(YU, YD) is a fine transformation used to generally estimate the locations of contours C_TU and C_TD, to represent the difference in the opening of the jaw between the previously processed image and the current image. Briefly, FIG. 11 illustrates an exemplary first-level teeth transformation on a deformable mouth model template, with lip contours C_UU, C_UD, C_DU and C_DD omitted for clarity. The dashed contours 1100 and 1102 belong to the template prior to the transformation, and the solid contours 1104 and 1106 belong to the template after the transformation. YU is a relative vertical displacement in the C_TU contour, and YD is a relative vertical displacement in the C_TD contour, as summarized below in Table 4. In the first-level teeth transformation, the locations of the control points of contours C_TU and C_TD are transformed in unison, as shown in Table 5, which is explained in detail hereinbelow.

Figure 12:
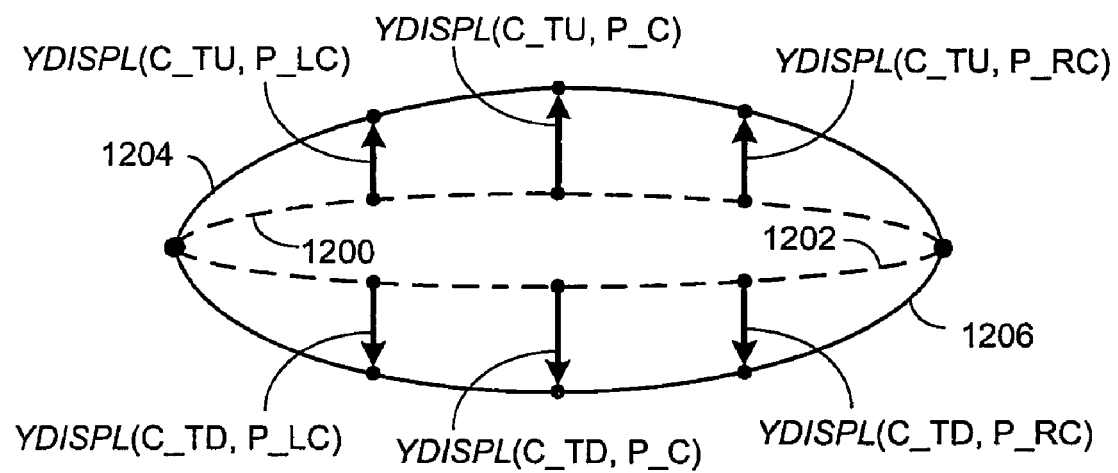
FIG. 12 is an illustration of an exemplary zero-level teeth transformation, according to some embodiments of the invention.

A "zero-level teeth transformation" $T_{0T}$(YDISPL(i,k)) is a superfine transformation used to refine the estimated location of individual control points of the teeth contours C_TU and C_TD. Briefly, FIG. 12 illustrates an exemplary zero-level teeth transformation on a deformable mouth model template, with lip contours C_UU, C_UD, C_DU and C_DD omitted for clarity. The dashed contours 1200 and 1202 belong to the template prior to the transformation, and the solid contours 1204 and 1206 belong to the template after the transformation. Transformation parameters YDISPL(i,k) represent relative vertical displacements between corresponding control points on teeth contour C_TU and C_TD.

The first-level and zero-level teeth transformations are used several times and in a defined order to refine the estimates of the teeth positions. It should be understood that in alternative embodiments of the invention, a different number of teeth transformation types may be used. Moreover, it should be understood that in alternative embodiments of the invention, teeth transformation types may be used a different number of times and in a different order or in no specific order.

Figure 13:
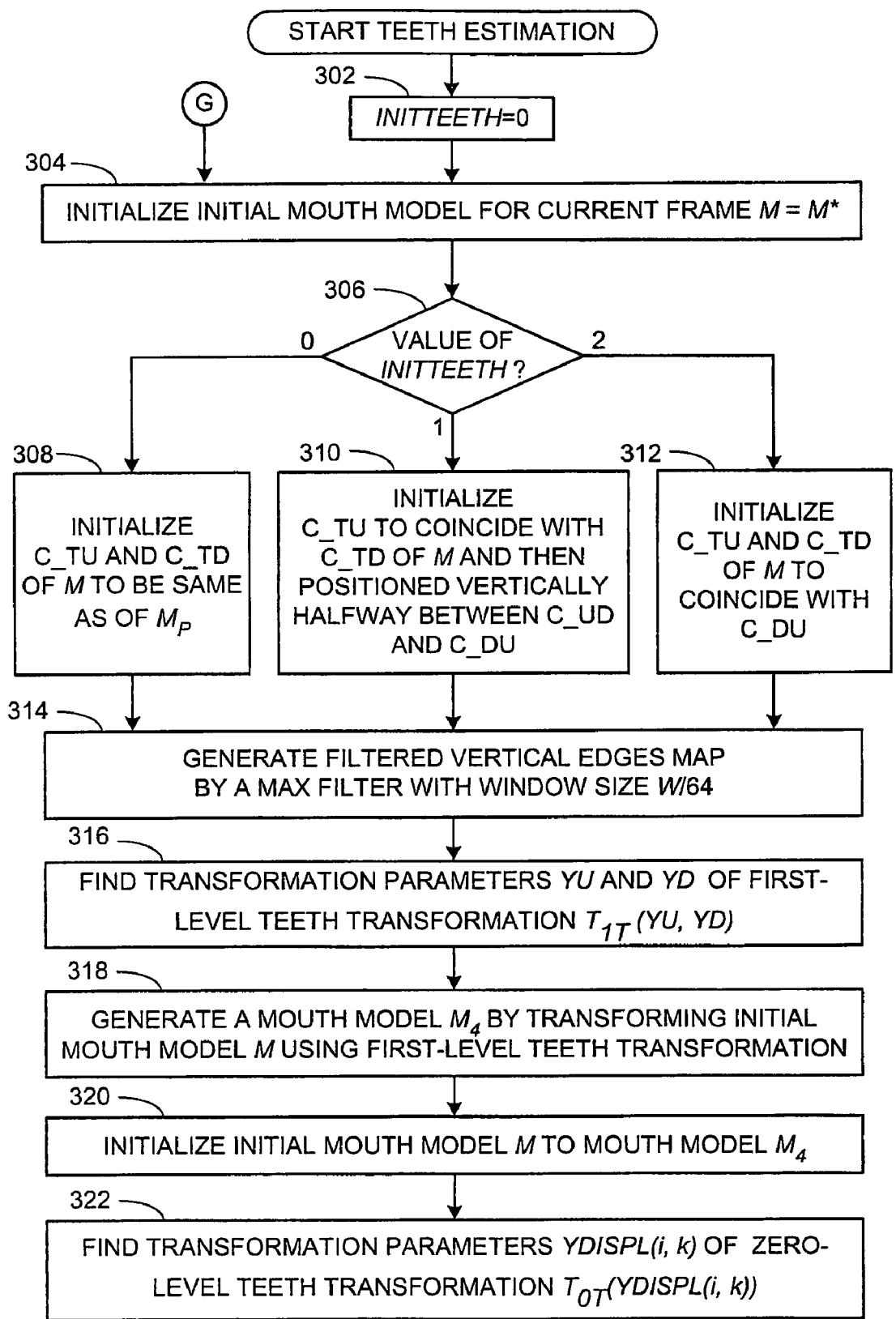
FIGS. 13-14 are a flowchart illustration of an exemplary method for estimating the position of the teeth in one of a sequence of digital images of a human face, according to some embodiments of the invention.
Figure 14:
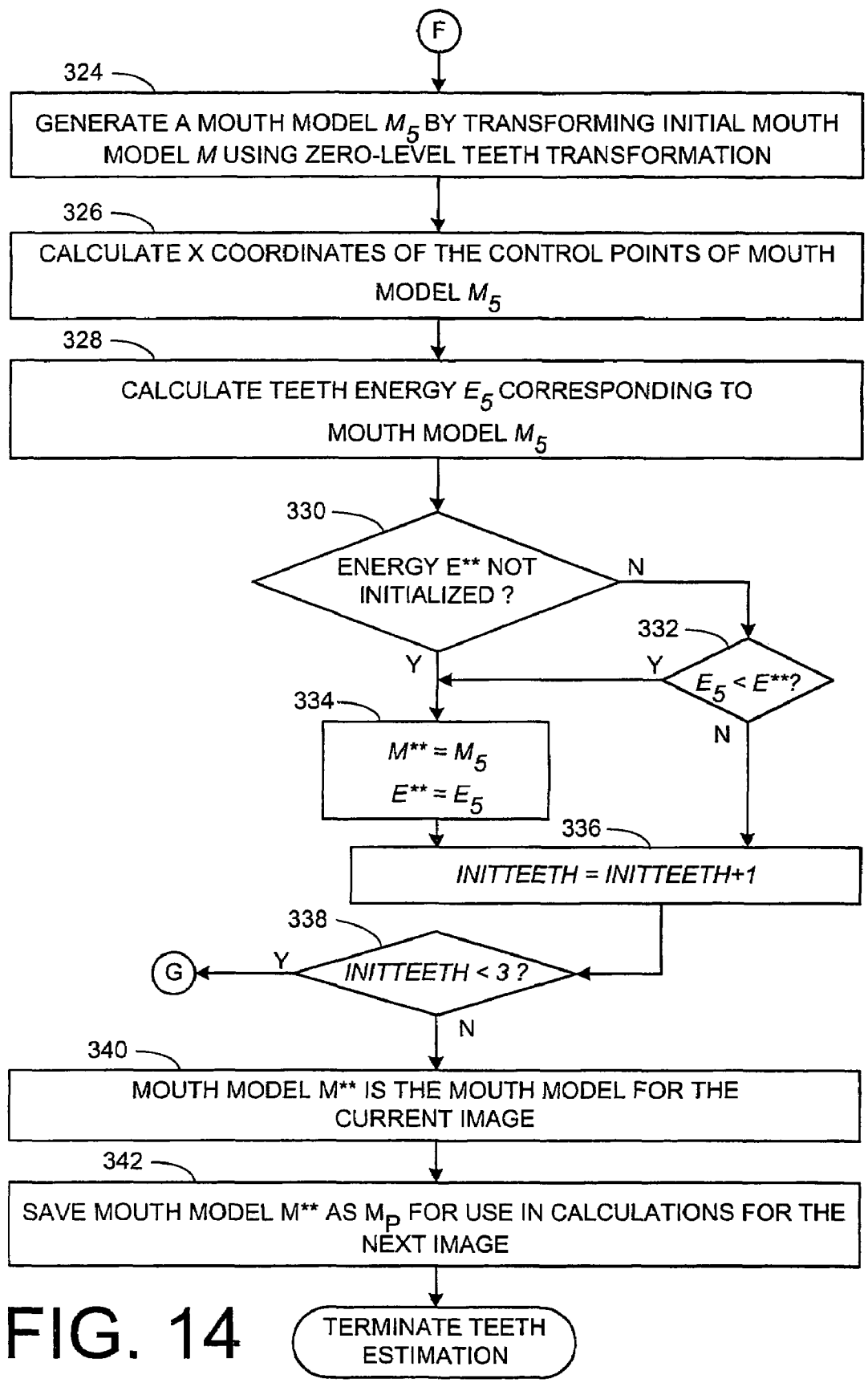

FIGS. 13 and 14 are a flowchart illustration of an exemplary method for estimating teeth positions in one of a sequence of images of a human face according to some embodiments of the invention.

Referring to FIG. 13, a variable "initteeth", used as a loop counter, is initialized to the value zero (302) and deformable mouth model template M for the current image is initialized to be equal to deformable mouth model template M* (304). The value of variable initteeth is checked (306).

If the value of variable initteeth equals zero, then the control points of "contour_teeth_up" (C_TU) and "contour_teeth_down" (C_TD) of deformable mouth model template M are initialized to coincide with the respective control points of "contour_teeth_up" (C_TU) and "contour_teeth_down" (C_TD) of deformable mouth model template $M_P$ of the previously processed image (308).

If the value of variable initteeth equals 1, then "contour_teeth_up" (C_TU) is initialized to coincide with "contour_teeth_down" (C_TD) of deformable mouth model template M, and is then positioned vertically halfway between "contour_up_down" (C_UD) and "contour_down_up" (C_DU) (310).

If the value of variable initteeth equals 2, then "contour_teeth_up" (C_TU) is initialized to coincide with "contour_teeth_down" (C_TD) and "contour_down_up" (C_DU) of deformable mouth model template M (312).

Vertical edges map $I^{V-EDGE}(x,y)$ is filtered using known or future methods, for example, the "MAX" filter of equation (8) with a W/64 window to generate a "filtered vertical edges map" (314).

Transformation parameters YU and YD of a first-level teeth transformation $T_{1T}$(YU,YD) are determined by minimizing a teeth energy objective function $E^T$, defined in equation (55) and calculated using blurred mouth images $I_B$, $I_P$, and I, the filtered spatial luminance peaks and valleys map and the filtered vertical edges map (316).

Determining parameters YU and YD is demonstrated in the following equation and can be obtained using known or future methods, such as, for example, gradient descent, downhill-simplex, and the like.

$$YU, YD = \arg\min_{YU,YD} E^T(T_{1T}(YU, YD), I) \quad (16)$$

A deformable mouth model template $M_4$ for the current image is generated (318) by transforming deformable mouth model template M using first-level teeth transformation $T_{1T}$(YU, YD).

Deformable mouth model template M is initialized with deformable mouth model template $M_4$ (320).

Transformation parameters YDISPL(i,k) of zero-level teeth transformation $T_{0T}$(YDISPL(i,k)) are determined by minimizing teeth energy objective function $E^T$, defined in equation (55) and calculated using mouth images $I_B$, $I_P$, and I, the spatial luminance peaks and valleys map and the vertical edges map (322).

Determining parameters YDISPL(i,k) is demonstrated in the following equation and can be obtained using known or future methods, such as, for example, gradient descent, downhill-simplex, and the like.

$$YDISPL(i, k) = \arg\min_{YDISPL(i,k)} E^T(T_{0T}(YDISPL(i, k)), I) \quad (17)$$

Referring now to FIG. 14, a deformable mouth model template $M_5$ for the current image is generated (324) by transforming deformable mouth model template M using zero-level teeth transformation $T_{0T}$(YDISPL(i,k)). X coordinates of the control points of deformable mouth model template $M_5$ are calculated (326) using the following equations:

$$X'(i, P\_C)=\tfrac{1}{2}X(i, P\_L)+\tfrac{1}{4}X(i, P\_R), i=P\_LC, P\_C, P\_RC \quad (18)$$

$$X'(i, P\_LC)=\tfrac{3}{4}X(i, P\_L)+\tfrac{1}{4}X(i, P\_R), =P\_LC, P\_C, P\_RC \quad (19)$$

$$X'(i, P\_RC)=\tfrac{1}{2}X(i, P\_L)+\tfrac{3}{4}X(i, P\_R), i=P\_C, P\_RC \quad (20)$$

Energy $E_5$, corresponding to deformable mouth model template $M_5$, is calculated using contour and control point values of deformable mouth model template $M_5$ in the equation for teeth energy objection function $E^T$ (328).

The minimum energy of $E^T$ once the teeth estimation procedure is completed is denoted E. In addition, the final deformable mouth model template once the teeth estimation procedure is completed is denoted M.

If energy E is not initialized (330) or if energy $E_5$ is less than E (332), a deformable mouth model template M is set equal to deformable mouth model template $M_5$, and E is set equal to energy $E_5$ (334).

Variable init1 is incremented by one (336).

If initteeth is less than 3 (338) the method continues from block (304) in FIG. 13. Otherwise, deformable mouth model template M** may be the resulting deformable mouth model template for the current image (340), and may be saved as $M_P$ for calculations for the next image (342).

Transformation Parameters

The transformation parameters of the lip transformations and teeth transformations are summarized below in Table 4.

TABLE 4

| Transformation Parameter | Represents |
| --- | --- |
| DX | relative horizontal displacement of center of mouth |
| DY | relative vertical displacement of center of mouth |
| DYu | difference in location of upper lip relative to center of mouth |
| DYd | difference in location of lower lip relative to center of mouth |
| DW | difference in estimated mouth stretching |
| YDISPL(i, k) | relative vertical displacement of a particular control point |
| XL | relative horizontal displacement of control point P_L |
| YL | relative vertical displacement of control point P_L |
| XR | relative horizontal displacement of control point P_R |
| YR | relative vertical displacement of control point P_R |
| YU | relative vertical displacement of C_TU contour |
| YD | relative vertical displacement of C_TD contour |

The effect of each transformation on the X-coordinates and Y-coordinates of the control points of the deformable mouth model template is summarized below in Table 5. For each transformation, the X- and Y-coordinates of a control point prior to the transformation are denoted X and Y, respectively, while the X- and Y-coordinate of the control point after the transformation are denoted X' and Y', respectively.

TABLE 5

| Transformation | Effect on Mouth Model Template |
| --- | --- |
| $T_{2L}$(DX, DY) second-level lip transformation | Y'(i, k) = Y(i, k) + DY<br>i = C_UU, C_UD, C_DU, C_DD<br>k = P_LC, P_C, P_RC<br>X'(P_L) = X(P_L) + DX<br>X'(P_R) = X(P_R) + DX<br>Y'(P_L) = Y(P_L) + DY<br>Y'(P_R) = Y(P_R) + DY |
| $T_{1L}$(DX, DY, DYu, DYd, DW) first-level lip transformation | Y'(i, k) = Y(i, k) + DY + ¾ DYu<br>i = C_UU, C_UD<br>k = P_LC, P_RC<br>Y'(j, k) = Y(j, k) + DY + ¾ DYd<br>j = C_DU, C_DD<br>k = P_LC, P_RC<br>Y'(i, P_C) = Y(i, P_C) + DY + DYu<br>i = C_UU, C_UD<br>Y'(i, P_C) = Y(i, P_C) + DY + DYd<br>i = C_DU, C_DD<br>X'(P_L) = X(P_L) + DX − ½ DW<br>X'(P_R) = X(P_R) + DX + ½ DW<br>Y'(P_L) = Y(P_L) + DY<br>Y'(P_R) = Y(P_R) + DY |
| $T_{0L}$(XL, XR, YL, YR, YDISPL(i, k)) zero-level lip transformation | Y'(i, k) = Y(i, k) + YDISPL(i, k)<br>i = C_UU, C_UD, C_DU, C_DD<br>k = P_LC, P_C, P_RC<br>X'(P_L) = X(P_L) + XL<br>X'(P_R) = X(P_R) + XR<br>Y'(P_L) = Y(P_L) + YL<br>Y'(P_R) = Y(P_R) + YR |
| $T_{1T}$(YU, YD) first-level teeth transformation | Y'(C_TU, k) = Y(C_TU, k) + YU<br>k = P_LC, P_C, P_RC<br>Y'(C_TD, k) = Y(C_TD, k) + YD<br>k = P_LC, P_C, P_RC |
| $T_{0T}$(YDISPL(i, k)) zero-level teeth transformation | Y'(i, k) = Y(i, k) + YDISPL(i, k)<br>i = C_TU, C_TD<br>k = P_LC, P_C, P_RC |

The Lips Energy Objective Function

Lips energy objective function $E^L$, defined hereinbelow in equation (21), may be minimized to determine optimal transformation parameters for second-level lip transformation $T_{2L}$(DX, DY) (block -214- of FIG. 8), first-level lip transformation $T_{1L}$(DX, DY, DYu, DYd, DW) (block -236- of FIG. 9) and zero-level lip transformation $T_{0L}$(XL, XR, YL, YR, YDISPL(i, k)) (block -252- of FIG. 9).

Known or future optimization methods, such as, for example, gradient descent, downhill simplex, and the like, may be used to, minimize lips energy objective function $E^L$. Moreover, initial transformation points for the optimization method may be equal to zero.

$$E^L(T,I(x,y))=E^L_{ext}(T,I(x, y))+E^L_{int}(T) \quad (21)$$

A generic transformation variable T appears explicitly in each energy term to indicate that the deformable mouth model templates used to evaluate an energy term are those after a transformation. Therefore, each energy term involves transformation parameters and the lips objective energy function may be minimized to determine optimal transformation parameters.

Equation (21) contains an internal energy term $E^L_{int}$, described in equation (22), which defines a certain penalty for model deformation, and an external energy term $E^L_{ext}$, described in equation (23), which defines how well the transformed lips model matches the lips of a real image.

$$E^L_{int}(T) = k^L_{center}E^L_{center}(T) + \qquad (22)$$
$$k^L_{elasticSP}E^L_{elasticSP}(T) + k^L_{bound}E^L_{bound}(T) + k^L_{elastic}E^L_{elastic}(T)$$

$$E^L_{ext}(T, I(x, y)) = k^L_{textureB}E^L_{texture}(M_B, I_B(x, y), M, I(x, y)) + \qquad (23)$$
$$k^L_{textureC}E^L_{texture}(M_P, I_P(x, y), M, I(x, y)) -$$
$$k^L_{edge}E^L_{edge}(T, I(x, y)) + k^L_{corners}E^L_{corners}(T, I(x, y)) +$$
$$k^L_{gaps}E^L_{TeethGaps}(T, I(x, y)) - k^L_{topography}E^L_{topography}(T, I(x, y))$$

Coefficients for Internal Energy Term and External Energy Term

Equation (22) for internal energy term $E^L_{int}$ includes coefficients $k^L_{center}$, $k^L_{elasticSP}$, $k^L_{bound}$ and $k^L_{elastic}$ that may be defined for each lip transformation level as described in Table 6 below. Similarly, equation (23) for external energy term $E^L_{ext}$ includes coefficients $k^L_{gaps}$, $k^L_{corners}$, $k^L_{edge}$, $k^L_{topography}$, $k^L_{textureB}$ and $k^L_{textureC}$ that may be defined for each lip transformation level as described in Table 7 below. Although the invention is not limited in this respect, these coefficients may be empirically defined, and may require tuning.

TABLE 6

| Coefficient | Level | | |
|---|---|---|---|
| | zero | first | second |
| $k^L_{center}$ | 5 | 5 | 5 |
| $k^L_{elasticSP}$ | 0.02 | 0 | 0 |
| $k^L_{bound}$ | 5000 | 5000 | 0 |
| $k^L_{elastic}$ | 0.4 | 0.4 | 0 |

TABLE 7

| Coefficient | Level | | |
|---|---|---|---|
| | zero | first | second |
| $k^L_{gaps}$ | 100 | 100 | 100 |
| $k^L_{corners}$ | 2 | 2 | 0 |
| $k^L_{edge}$ | 0.6 | 0.6 | 0.6 |
| $k^L_{topography}$ | 0.3 | 0.3 | 0.3 |
| $k^L_{textureB}$ | 0.3 | 0.3 | 0.3 |
| $k^L_{textureC}$ | 0.3 | 0.3 | 0.3 |

Internal Energy Term

Center Energy Term $E^L_{center}$

The center energy term $E^L_{center}$ may be selected to attract the center of the deformable mouth model template to an approximate central position of the mouth region of interest in the facial image. An exemplary center energy term $E^L_{center}$ is presented in the following equation. It will be appreciated that center energy term $E^L_{center}$ may be calculated using a variation of the following equation or alternatively, using other methods.

$$E^L_{center}(T) = E^L_{centerX}(T) + E^L_{centerY}(T) \qquad (24)$$

The X and Y components of the exemplary center energy term $E^L_{center}$ are presented in the following equations:

$$E^L_{centerX}(T) = \begin{cases} 0, & |D_W| < W/6 \\ \left(\frac{(|D_W| - W/6)}{W/6}\right)^2, & |D_W| \geq W/6 \end{cases} \qquad (25)$$

$$D_W = (X(P\_R) + X(P\_L))/2 - W/2 \qquad (26)$$

$$E^L_{centerY}(T) = \begin{cases} 0, & |D_H| < H/6 \\ \left(\frac{(|D_H| - H/6)}{H/6}\right)^2, & |D_H| \geq H/6 \end{cases} \qquad (27)$$

$$D_H = \left(Y(P\_R) + Y(P\_L) + \sum_{i,j} Y(i, j)\right) \Big/ 14 - H/2 \qquad (28)$$

where in equations (25) and (26), "W" denotes the mouth image width as determined in block -82- of FIG. 3, and in equations (27) and (28), "H" denotes the mouth image height as determined in block -82- of FIG. 3. In equation (28), the index i runs over all contours and the index j over the control points P_LC, P_C and P_RC.

Elastic Spline Energy Term $E^L_{elasticSP}$

The elastic spline energy term $E^L_{elasticSP}$ may be selected to cause the lip contours to be smooth at first approximation. An exemplary elastic spline energy term $E^L_{elasticSP}$ is presented in the following equation. It will be appreciated that elastic spline energy term $E^L_{elasticSP}$ may be calculated using a variation of the following equation or alternatively, using other methods.

$$E^L_{elasticSP}(T) = \frac{mw^2}{4} \sum_i \left\{ \begin{array}{l} (0.75Y(i, P\_C) - 0.125Y(i, P\_R) + \\ 0.375Y(i, P\_L) - Y(i, P\_LC))^2 + \\ (0.75Y(i, P\_C) + 0.375Y(i, P\_R) - \\ 0.125Y(i, P\_L) - Y(i, P\_RC))^2 \end{array} \right\} \qquad (29)$$

$i = $ C_UU, C_UD, C_DU, C_DD where "mw" denotes the width of the mouth in the base image.

Bound Energy Term $E^L_{bound}$

The bound term $E^L_{bound}$ may be selected to ensure that the deformable mouth model template derived by minimizing lips energy objective function $E^L$ represents a physiologically possible state of a mouth. An exemplary bound energy term $E^L_{bound}$ is presented in the following equation. It will be appreciated that bound energy term $E^L_{bound}$ may be calculated using a variation of the following equation or alternatively, using other methods.

$$E^L_{bound}(T) = \sum_p \left\{ \begin{array}{l} PAR(Y(C\_UD, p) - Y(C\_UU, p), 0, 2UH) + \\ PAR(Y(C\_DU, p) - Y(C\_UU, p), 0, 2W/3) + \\ PAR(Y(C\_DD, p) - Y(C\_DU, p), 0, 2DH) \end{array} \right\} + \qquad (30)$$

$$\sum_c PAR(dy(c), dy0(c), dy1(c))$$

where the function PAR is given in the following equation:

$$PAR(x, x0, x1) = \begin{cases} 0, & x \in [x0, x1] \\ (x-x0)^2, & x < x0 \\ (x-x1)^2, & x > x1 \end{cases} \quad (31)$$

and dy, dy0 and dy1 are given in the following set of equations:

$$dy(c) = Y(c, P\_C) - y1 \quad (32)$$

$$y0 = (Y(c, P\_L) + Y(c, P\_R))/2 \quad (33)$$

$$y1 = (Y(c, P\_LC) + Y(c, P\_RC))/2 \quad (34)$$

$$y2 = (y1 - y0)/4 \quad (35)$$

$$dy0(C\_UU) = y2 - mw/16 \quad (36)$$

$$dy0(C\_UD) = y2 - mw/8 \quad (37)$$

$$dy0(C\_DU) = \min(\max(y2 - mw/32, 0), -mw/16) \quad (38)$$

$$dy0(C\_DD) = \min(\max(y2 - mw/16, 0), -mw/8) \quad (39)$$

$$dy1(C\_UU) = y2 + mw/16 \quad (40)$$

$$dy1(C\_UD) = y2 + mw/16 \quad (41)$$

$$dy1(C\_DU) = \min(y2 + mw/8, 0) \quad (42)$$

$$dy1(C\_DD) = \min(\max(y2 - mw/32, 0), mw/8) \quad (43)$$

and in equations (30)-(43), "mw" denotes the width of the mouth in the base image, "DH" denotes the height of the lower lip in the base image, and "UH" denotes the height of the upper lip in the base image.

Elastic Energy Term $E^L_{Elastic}$

The elastic energy term $E^L_{elastic}$ may be selected to describe two sets of virtual vertical springs connecting the inner and outer contours of the lips and to describe a virtual horizontal spring connecting the mouth corners. An exemplary elastic energy term $E^L_{elastic}$ is presented in the following equation. It will be appreciated that elastic energy term $E^L_{elastic}$ may be calculated using a variation of the following equation or alternatively, using other methods.

$$E^L_{elastic}(T) = 2.8\left(64\frac{mw_C - mw}{mw}\right)^2 + \quad (44)$$

$$0.2 \sum_{P \in (P\_LC, P\_C, P\_RC)} \left(\left(64\frac{yu_P - yub_P}{mw}\right)^2 + \left(64\frac{yd_P - ydb_P}{mw}\right)^2\right)$$

where "$yu_P$" denotes the height of the upper lip at the P control point in the current image, "$yd_P$" denotes the height of the lower lip at the P control point in the current image, "$yub_P$" denotes the height of the upper lip at the P control point in the base image, and "$ydb_P$" denotes the height of the lower lip at the P control point in the base image.

External Energy Term

Texture Energy Term $E^L_{texture}$

An exemplary texture energy term $E^L_{texture}$ is presented in the following equation. The texture energy term involves mouth images. When the lips objective energy $E^L$ is calculated during the iterations with second-level lip transformations, double-blurred mouth images are used in the texture energy term instead of unblurred mouth images. When the lips objective energy $E^L$ is calculated during the iterations with first-level lip transformations, blurred mouth images are used in the texture energy term instead of unblurred mouth images. It will be appreciated that texture energy term $E^L_{texture}$ may be calculated using a variation of the following equation or alternatively, using other methods.

$$E^L_{texture}(M_A, A(x,y), M_B, B(x,y)) = \quad (45)$$

$$\frac{1}{S(A_{LC})} \sum_{(x,y) \in A_{LC}} (A(x,y) - B(x+dx_L, y+dy_L))^2 +$$

$$\frac{1}{S(A_{RC})} \sum_{(x,y) \in A_{RC}} (A(x,y) - B(x+dx_R, y+dy_R))^2 +$$

$$\frac{1}{S(A_{UL})} \sum_{(x,y) \in A_{UL}} (A(x,y) - B(x'(x), yu(x,y)))^2 +$$

$$\frac{1}{S(A_{DL})} \sum_{(x,y) \in A_{DL}} (A(x,y) - B(x'(x), yd(x,y)))^2$$

where deformable mouth model template $M_B$ and mouth image $B(x,y)$ are of a current image, and deformable mouth model template $M_A$ and mouth image $A(x,y)$ are of a previously processed or a base image;

where $S(A_i)$ is the area of $A_i$, where $dx_L$ and $dy_L$ are relative displacements between control point P_L of deformable mouth model template $M_A$ and control point P_L of deformable mouth model template $M_B$ on two perpendicular axes "X" and "Y", respectively; and where $dx_R$ and $dy_R$ are relative displacements between control point P_R of deformable mouth model template $M_A$ and control point P_R of deformable mouth model template $M_B$ on two perpendicular axes "X" and "Y", respectively.

In equation (45), $x'(x)$ and $yu(x,y)$ are coordinate transformation functions from control points of contours C_UU and C_UD of deformable mouth model template $M_A$ to control points of contours C_UU and C_UD of deformable mouth model template $M_B$, and $x'(x)$ and $yd(x,y)$ are coordinate transformation functions from control points of contours C_DU and C_DD of deformable mouth model template $M_A$ to control points of contours C_DU and C_DD of deformable mouth model template $M_B$, as detailed in the following equations:

$$x'(x) = (x - xL_A)(xR_B - xL_B)/(xR_A - xL_A) + xL_B \quad (46)$$

where parameters $xL_A$ and $xR_A$ are X coordinates of control points P_L and P_R, respectively, of deformable mouth model template $M_A$, and parameters $xL_B$ and $xR_B$ are X coordinates of control points P_L and P_R, respectively, of deformable mouth model template $M_B$;

$$yu(x,y) = (y - yuu_A(x)) * \frac{(yud_B(x'(x)) - yuu_B(x'(x)))}{(yud_A(x) - yuu_A(x)) + yuu_B(x'(x))} \quad (47)$$

$$yd(x,y) = (y - ydd_A(x)) * \frac{(ydd_B(x'(x)) - ydu_B(x'(x)))}{(ydd_A(x) - ydu_A(x)) + ydu_B(x'(x))} \quad (48)$$

where parameters $yuu_A(x)$, $yud_A(x)$, $ydu_A(x)$ and $ydd_A(x)$ are the Y coordinates of contour C_UU, C_UD, C_DU and C_DD, respectively, of deformable mouth model template $M_A$, and parameters $yuu_B(x)$, $yud_B(x)$, $ydu_B(x)$ and $ydd_B(x)$ are the Y coordinates of contour C_UU, C_UD, C_DU and C_DD, respectively, of deformable mouth model template $M_B$.

Edge Energy Term $E^L_{edge}$

The edge energy term $E^L_{edge}$ may be selected to attract the deformable mouth model template to vertical intensity gradients. An exemplary edge energy term $E^L_{edge}$ is presented in the following equation, calculated as a sum of pixel values of the vertical edges map along contours C(C_UU), C(C_UD), C(C_DU), C(C_DU).

$$E^L_{edge}(T, I(x, y)) = \sum_i \frac{1}{Len(C(i))} \sum_{(x,y) \subset C(i)} k_i I^{V-EDGE}(x, y) \quad (49)$$

$$i = C\_UU, C\_UD, C\_DU, C\_DD$$

$$k_i = \begin{cases} 1, & i = C\_UU, C\_DU \\ 0.2, & i = C\_UD, C\_DD \end{cases}$$

where vertical edges map $I^{V-EDGE}(x,y)$ is defined hereinabove in equation (4), "i" is an index of lip contours in the deformable mouth model template, C(i) represents the contour indexed by i, and Len(C(i)) denotes the length of contour C(i). Coefficients $k_i$ may defined in relation to the sharpness of the lips when light fall on them from above. In an exemplary situation, when the edges of the upper lips are sharper than the edges of the lower lips, a coefficient may be defined larger for C_UU and C_DU than for C_UD and C_DD.

When the lips objective energy $E^L$ is calculated during the iterations with second-level lip transformations, a double-filtered vertical edges map is used in the edge energy term instead of the unfiltered vertical edges map. When the lips objective energy $E^L$ is calculated during the iterations with first-level lip transformations, a filtered vertical edges map is used in the edge energy term instead of the unfiltered vertical edges map.

Corners Energy Term $E^L_{corners}$

The corner energy term $E^L_{corners}$ may be selected to attract the corners of the lips to a specific edge structure. An exemplary corner energy term $E^L_{corners}$ is presented in the following equation. It will be appreciated that corner energy term $E^L_{corners}$ may be calculated using a variation of following equation or alternatively, using other methods.

$$E^L_{corners}(T, I(x, y)) = \frac{\left( \sum_{(x,y) \subset A_{LC}} KL(x, y) * I^{V-EDGE}(x, y) + \sum_{(x,y) \subset A_{RC}} KR(x, y) * I^{V-EDGE}(x, y) \right)}{S(A_{LC} + A_{RC})} \quad (50)$$

where $S(A_i)$ is the area of $A_i$, and kernels KL and KR are defined as follows:

$$KL(x, y) = \begin{cases} 1, & x < X(P\_L) \text{ or } y = Y(P\_L) \\ -1 & \text{otherwise,} \end{cases} \quad (51)$$

$$KR(x, y) = \begin{cases} 1, & x > X(P\_R) \text{ or } y = Y(P\_R) \\ -1 & \text{otherwise,} \end{cases} \quad (52)$$

Graphically the kernels may be viewed as approximately

```
-----+++++
-----+++++
++++++++++
-----+++++
-----+++++
``` for the right corner and as approximately

```
+++++-----
+++++-----
++++++++++
+++++-----
+++++-----
``` for the left corner. The "−" sign is for −1 and the "+" sign is for +1.

When the lips objective energy $E^L$ is calculated during the iterations with second-level lip transformations, a double-filtered vertical edges map is used in the corners energy term instead of the unfiltered vertical edges map. When the lips objective energy $E^L$ is calculated during the iterations with first-level lip transformations, a filtered vertical edges map is used in the corners energy term instead of the unfiltered vertical edges map.

Teeth Gap Energy Term $E^L_{TeethGap}$

An exemplary teeth gap energy term $E^L_{TeethGap}$ to describe the presence of a vertical tooth gap in the lip area is presented in the following equation. The teeth gap energy will be minimal to exclude teeth from the lip area. It will be appreciated that teeth gap energy term $E^L_{TeethGap}$ may be calculated using a variation of the following equation or alternatively, using other methods.

$$E^L_{TeethGap}(T, I(x, y)) = \frac{1}{S(A_1)} \sum_{(x,y) \subset A_1} I^{TG}(x, y) + \frac{1}{S(A_2)} \sum_{(x,y) \subset A_2} I^{TG}(x, y) \quad (53)$$

$$A_1 = A_{UL} - (A_{RC} + A_{LC}), \quad A_2 = A_{DL} - (A_{RC} + A_{LC})$$

where $S(A_i)$ is the area of $A_i$, and $I^{TG}(x,y)$ is the teeth vertical gaps map defined hereinabove in equations (1)-(3).

Topography Energy Term $E^L_{topography}$

An exemplary topography energy term $E^L_{topography}$ to represent white teeth or a dark mouth cavity between the lips is presented in the following equation. It will be appreciated that topography energy term $E^L_{topography}$ may be calculated using a variation of the following equation or alternatively, using other methods.

$$E^L_{topography}(T, I(x, y)) = \frac{1}{S(A_{UT} + A_{MC} + A_{DT})} \sum_{(x,y) \in (A_{UT}+A_{MC}+A_{DT})} I^{PEAK\text{-}VALLEY}(x, y) \quad (54)$$

where $S(A_i)$ is the area of $A_i$, and $I^{PEAK\text{-}VALLEY}(x,y)$ is a spatial luminance peaks and valleys map, that can be obtained using known or future methods.

When the lips objective energy $E^L$ is calculated during the iterations with second-level lip transformations, a double-filtered spatial luminance peaks and valleys map is used in the topography energy term instead of the unfiltered spatial luminance peaks and valleys map. When the lips objective energy $E^L$ is calculated during the iterations with first-level lip transformations, a filtered spatial luminance peaks and valleys map is used in the topography energy term instead of the unfiltered spatial luminance peaks and valleys map.

The Teeth Energy Objective Function

Teeth energy objective function $E^T$, defined herein below in equation (55), may be minimized to determine optimal transformation parameters for first-level teeth transformation $T_{1T}(YU, YD)$ (block -316- of FIG. 13) and zero-level teeth transformation $T_{0T}(YDISPL(i, k))$ (block -322- of FIG. 13).

Known or future optimization methods, such as, for example, a downhill simplex method, may be used to minimize teeth energy objective function $E^T$. Moreover, initial parameters for the downhill simplex method may be equal to transformation parameters that were computed for the previously processed image.

$$E^T(T, I(x, y)) = E^T_{ext}(T, I(x, y)) + E^T_{int}(T) \quad (55)$$

Equation (55) contains an internal energy term $E^T_{int}$, described in equation (56), which defines a certain penalty for model deformation, and an external energy term $E^T_{ext}$, described in equation (57), which defines how well the transformed teeth model matches the teeth of a real image.

$$E^T_{int}(T) = E^T_{bound}(T) + E^T_{elastic}(T) + k^T_{elasticSP}E^T_{elasticSP}(T) \quad (56)$$

$$E^T_{ext}(T, I(x, y)) = -k^T_{edge}E^T_{edge}(T, I(x, y)) - \\ k^T_{gaps}E^T_{TeethGaps}(T, I(x, y)) - \\ k^T_{intensity}E^T_{intensity}(T, I(x, y)) + \\ k^T_{dispersion}E^T_{dispersion}(T, I(x, y)) \quad (57)$$

Coefficients for Internal Energy Term and External Energy Term

Equation (56) for internal energy term $E^T_{int}$ includes the coefficient $k^T_{elasticSP}$, equation (58) below includes $k^T_{bound}$, and equation (59) below includes $k^T_{spring}$. These coefficients may be defined for each teeth transformation level as described in Table 8 below. Similarly, equation (57) for external energy term $E^T_{ext}$ includes coefficients $k^T_{edge}$, $k^T_{gaps}$, $k^T_{intensity}$ and $k^T_{dispersion}$ that may be defined for each tooth transformation level as described in Table 9 below. Although the invention is not limited in this respect, these coefficients may be empirically defined, and may require tuning.

TABLE 8

| Coefficient | Level | |
|---|---|---|
| | zero | first |
| $k^T_{bound}$ | 10000 | 10000 |
| $k^T_{spring}$ | 1 | 2 |
| $k^T_{elasticSP}$ | 5000 | 0 |

TABLE 9

| Coefficient | Level | |
|---|---|---|
| | Zero | first |
| $k^T_{edge}$ | 2 | 2 |
| $k^T_{gaps}$ | 10 | 10 |
| $k^T_{intensity}$ | 1 | 1 |
| $k^T_{dispersion}$ | 0 | 0.25 |

Internal Energy Term

Bound Energy Term $E^T_{bound}$

The bound term $E^T_{bound}$ may be selected to ensure that the deformable mouth model template derived by minimizing teeth energy objective function $E^T$ represents a physiologically possible state of a mouth. The teeth contours must not overlap and must be located between the inner lip contours. An exemplary bound energy term $E^T_{bound}$ is presented in the following equation. It will be appreciated that bound energy term $E^T_{bound}$ may be calculated using a variation of the following equation or alternatively, using other methods.

$$E^T_{bound}(T) = \begin{cases} 0, \text{ if } Y(i_D, j) \geq Y(i_U, j) \text{ for all points } j \text{ on all pairs of contours} \\ k^T_{bound} \sum_j (Y(i_D, j) - Y(i_U, j))^2, \text{ if } Y(i_D, j) < Y(i_U, j) \end{cases} \quad (58)$$

$i_U = \{C\_UD, C\_TU, C\_TD\}$
$i_D = \{C\_TU, C\_TD, C\_DU\}$
$j = \{P\_LC, P\_C, P\_RC\}$ for all points j on all pairs of contours

Elastic Energy Term $E^T_{elastic}$

The elastic energy term $E^T_{elastic}$ may be selected to describe two sets of virtual vertical springs connecting the inner and outer contours of the lips with the teeth (control points of C_UU with C_TU and control points of C_DD with C_TD). An exemplary elastic energy term $E^T_{elastic}$ is presented in the following equation. It will be appreciated that elastic energy term $E^T_{elastic}$ may be calculated using a variation of the following equation or alternatively, using other methods.

$$E^T_{elastic}(T) = (k^T_{spring})^2 \sum_j \left( \left( \frac{Y(C\_UU, j) - Y(C\_TU, j) -}{Y_B(C\_UU, j) + Y_B(C\_TU, j)} \right)^2 + \left( \frac{Y(C\_TD, j) - Y(C\_DD, j) -}{Y_B(C\_TD, j) + Y_B(C\_DD, j)} \right)^2 \right) \quad (59)$$

$j = \{P\_LC, P\_C, P\_RC\}$ where Y(i, j) are the Y coordinates of control points in the current image, and $Y_B(i, j)$ are the Y coordinates of control points in the base image.

Elastic Spline Energy Term $E^T_{elasticSP}$

The elastic spline energy term $E^T_{elasticSP}$ may be selected to cause the teeth contours to be smooth at first approximation. An exemplary elastic spline energy term $E^T_{elasticSP}$ is presented in the following equation. It will be appreciated that elastic spline energy term $E^T_{elasticSP}$ may be calculated using a variation of the following equation or alternatively, using other methods.

$$E^T_{elasticSP}(T) = \sum_i \left( \begin{array}{c} (0.75Y(i, P\_C) - 0.125Y(i, P\_R) + \\ 0.375Y(i, P\_L) - Y(i, P\_LC) \end{array})^2 + \\ (0.75Y(i, P\_C) + 0.375Y(i, P\_R) - \\ 0.125Y(i, P\_L) - Y(i, P\_RC) )^2 \right) \quad (60)$$

$i = C\_TU, C\_TD$

External Energy Term (82)

Edge Energy Term $E^T_{edge}$

An exemplary edge energy term $E^T_{edge}$ is presented in the following equation. It will be appreciated that edge energy term $E^T_{edge}$ may be calculated using a variation of the following equation or alternatively, using other methods.

$$E^T_{edge}(T, I(X, Y)) = \sum_{(x,y) \in C\_TD} I^{V-EDGE}(x, y) - \sum_{(x,y) \in C\_TU} I^{V-EDGE}(x, y) \quad (61)$$

where the vertical edges map $I^{V-EDGE}(x,y)$ is given in equation (4) hereinabove.

Dispersion Energy Term $E^T_{dispersion}$

The dispersion energy term $E^T_{dispersion}$ is selected to correspond to image intensity dispersions in the teeth areas. An exemplary dispersion energy term $E^T_{dispersion}$ is presented in the following equation. It will be appreciated that dispersion energy term $E^T_{dispersion}$ may be calculated using a variation of the following equation or alternatively, using other methods.

$$E^T_{dispersion}(T, I(x, y)) = \sum_{(x,y) \in A_1} \left( I(x, y) - \frac{1}{S(A_1)} \sum_{(x,y) \in A_1} I(x, y) \right)^2 - \\ \sum_{(x,y) \in A_2} \left( I(x, y) - \frac{1}{S(A_2)} \sum_{(x,y) \in A_2} I(x, y) \right)^2 \quad (62)$$

$A_1 = A_{UT} - (A_{RC} + A_{LC}), A_2 = A_{DT} - (A_{RC} + A_{LC})$ where $S(A_i)$ is the area of $A_i$.

Intensity Energy Term $E^T_{intensity}$

The intensity energy term $E^T_{intensity}$ is selected to correspond to the average intensity (or peaks map) difference between the cavity of the mouth and the teeth areas. An exemplary intensity energy term $E^T_{intensity}$ is presented in the following equation. It will be appreciated that intensity energy term $E^T_{intensity}$ may be calculated using a variation of the following equation or alternatively, using other methods.

$$E^T_{intensity}(T, I(x, y)) = \frac{1}{S(A_1)} \sum_{(x,y) \in A_1} I(x, y) + \\ \frac{1}{S(A_2)} \sum_{(x,y) \in A_2} I(x, y) - \frac{1}{S(A_{MC})} \sum_{(x,y) \in A_{MC}} I(x, y) \quad (63)$$

$A_1 = A_{UT} - (A_{RC} + A_{LC}), A_2 = A_{DT} - (A_{RC} + A_{LC})$ where $S(A_i)$ is the area of $A_i$, and $I(x,y)$ is an image intensity map or a spatial luminance peaks and valleys map, obtained using known or future methods.

Teeth Gap Energy Term $E^T_{TeethGap}$

The teeth gap energy term $E^T_{TeethGap}$ may be selected to describe vertical teeth gaps or vertical edge is teeth areas (between contours C_UD and C_TU and between contours C_TD and C_DU) and their absence in the mouth cavity (between the C_TU and C_TD contours). An exemplary teeth gap energy term $E^T_{TeethGap}$ is presented in the following equation. It will be appreciated that teeth gap energy term $E^T_{TeethGap}$ may be calculated using a variation of the following equation or alternatively, using other methods.

$$E^T_{TeethGap}(T, I(x, y)) = \frac{1}{S(A_1)} \sum_{(x,y) \in A_1} I^{TG}(x, y) + \\ \frac{1}{S(A_2)} \sum_{(x,y) \in A_2} I^{TG}(x, y) - \frac{1}{S(A_{MC})} \sum_{(x,y) \in A_{MC}} I^{TG}(x, y) \quad (64)$$

$A_1 = A_{UT} - (A_{RC} + A_{LC}), A_2 = A_{DT} - (A_{RC} + A_{LC})$ where $S(A_i)$ is the area of $A_i$, and $I^{TG}(x,y)$ is the teeth vertical gaps map defined hereinabove in equations (1)-(3).

Figure 15:
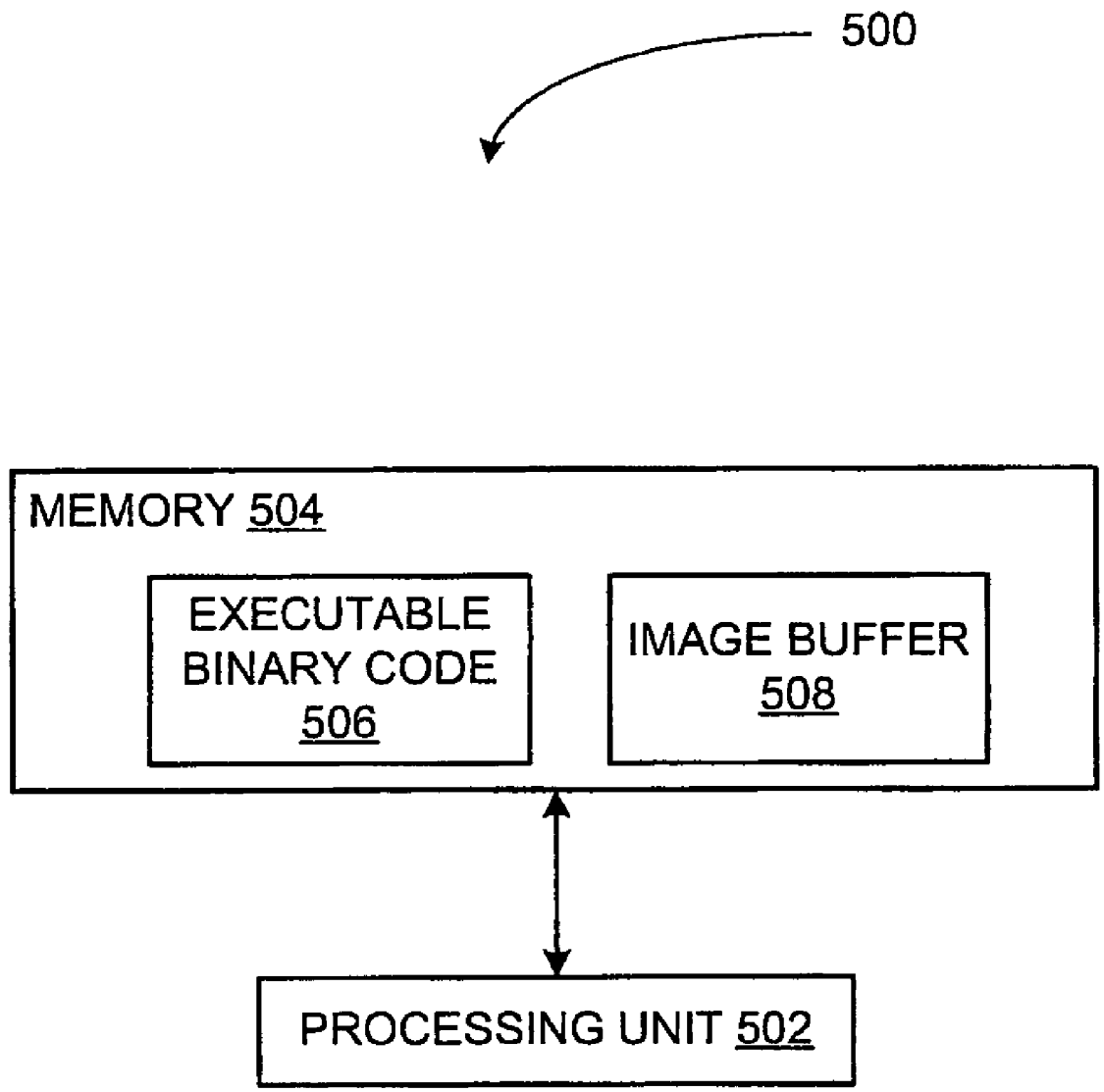
FIG. 15 is a simplified block diagram of an exemplary apparatus to execute a method for estimating position and shape of lips and for optionally estimating position of teeth in one of a sequence of digital images of a human face according to some embodiments of the invention.

FIG. 15 is a simplified block diagram of an exemplary apparatus 500 to execute a method for estimating position and shape of lips and for optionally estimating position of teeth in one of a sequence of images of a human face according to some embodiments of the invention. Apparatus 500 may comprise a processing unit 502 and a memory 504 coupled to processing unit 502.

A non-exhaustive list of examples for apparatus 500 includes a desktop personal computer, a work station, a server computer, a laptop computer, a notebook computer, a hand-held computer, a personal digital assistant (PDA), a mobile telephone, a cellular phone, a video phone, a teleconference station, a video camera, a stills camera, a video game station, a surveillance equipment, and the like.

A non-exhaustive list of examples for processing unit 502 includes any combination of the following:
  processors, such as
    a central processing unit (CPU), a graphics processing unit (GPU), a graphic accelerator, a digital signal processor (DSP), a reduced instruction set computer (RISC), a complex instruction set computer (CISC), and the like, and logic devices, such as
- complex programmable logic device (CPLD), a gate array, a field programmable gate array (FPGA), an application specific integrated circuit (ASIC), an application specific standard product (ASSP), and the like.

Moreover, processing unit 502 may be implemented in part or in whole in an application specific integrated circuit (ASIC), an application specific standard product (ASSP), and the like.

Memory 504 may be fixed in or removable from apparatuses 500. A non-exhaustive list of examples for memory 504 includes any combination of the following:

semiconductor devices, such as
- synchronous dynamic random access memory (SDRAM) devices, RAMBUS dynamic random access memory (RDRAM) devices, double data rate (DDR) memory devices, static random access memory (SRAM), flash memory devices, electrically erasable programmable read only memory devices (EEPROM), non-volatile random access memory devices (NVRAM), universal serial bus (USB) removable memory, and the like, optical devices, such as
- compact disk read only memory (CD ROM), and the like, and magnetic devices, such as
- a hard disk, a floppy disk, a magnetic tape, and the like.

The method for estimating position and shape of lips and for optionally estimating position of teeth in at least one of a sequence of images of a human face according to some embodiments of the invention may be implemented in an executable or interpretable binary code 506 stored in memory 504. Alternatively, the method may be partly implemented in executable or interpretable binary code 506 and may be partly hardwired in processing unit 502.

Memory 504 may include one or more image buffers 508 to store images, such as, for example, images of the sequence.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method comprising:
   estimating features of a mouth in a current image of a sequence of digital images of a human face by deriving a deformable mouth model template in an iterative process, said process including:
   minimizing an energy function receiving iteration-dependent arguments to determine optimal transformation parameters of an iteration-dependent transformation;
   transforming components of said deformable mouth model template by said iteration-dependent transformation having said optimal transformation parameters;
   double-blurring particular digital images of said sequence to produce double-blurred images; and
   double-filtering maps derived from said current image to produce double-filtered maps,
   wherein for a particular iteration, minimizing said energy function includes minimizing said energy function receiving said double-blurred images and said double-filtered maps, and said iteration-dependent transformation is a coarse transformation.

2. The method of claim 1, wherein said process further includes:
   initializing said deformable mouth model template according to a base image of said sequence.

3. The method of claim 1, wherein estimating said features includes estimating positions of lips of said mouth.

4. The method of claim 1, wherein estimating said features includes estimating shapes of lips of said mouth.

5. The method of claim 1, wherein estimating said features includes estimating positions of teeth in said mouth.

6. The method of claim 1, wherein double-blurring said particular digital images includes double-blurring said current image, double-blurring a previously processed image of said sequence and double-blurring a base image of said sequence.

7. The method of claim 1, wherein double-filtering said maps includes double-filtering a spatial luminance peaks and valleys map derived from said current image and double-filtering a vertical intensity gradient map derived from said current image.

8. The method of claim 1, wherein double-filtering said maps includes applying a dilate morphological operator recursively to said maps.

9. The method of claim 1, wherein said coarse transformation represents a relative displacement of a center of said mouth.

10. A method comprising:
estimating features of a mouth in a current image of a sequence of digital images of a human face by deriving a deformable mouth model template in an iterative process, said process including:
minimizing an energy function receiving iteration-dependent arguments to determine optimal transformation parameters of an iteration-dependent transformation;
transforming components of said deformable mouth model template by said iteration-dependent transformation having said optimal transformation parameters;
blurring particular digital images of said sequence to produce blurred images; and
filtering maps derived from said current image to produce filtered maps,
wherein for a particular iteration, minimizing said energy function includes minimizing said energy function receiving said blurred images and said filtered maps, and said iteration-dependent transformation is a fine transformation.

11. The method of claim 10, wherein blurring said particular digital images includes blurring said current image, blurring a previously processed image of said sequence and bluffing a base image of said sequence.

12. The method of claim 10, wherein filtering said maps includes filtering a spatial huminance peaks and valleys map derived from said current image and filtering a vertical intensity gradient map derived from said current image.

13. The method of claim 10, wherein filtering said maps includes applying a dilate morphological operator to said maps.

14. The method of claim 10, wherein said fine transformation is a lip transformation that represents a relative displacement of a center of said mouth, a relative stretching of said mouth and a relative opening of the jaw of said mouth.

15. The method of claim 10, wherein said fine transformation is a teeth transformation that represents a relative opening of the jaw of said mouth.

16. A method comprising:
estimating features of a mouth in a current image of a sequence of digital images of a human face by deriving a deformable mouth model template in an iterative process, said process including:
minimizing an energy function receiving iteration-dependent arguments to determine optimal transformation parameters of an iteration-dependent transformation; and
transforming components of said deformable mouth model template by said iteration-dependent transformation having said optimal transformation parameters,
wherein for a particular iteration, said iteration-dependent transformation is a superfine transformation and minimizing said energy function includes minimizing said energy function receiving said current image, a previously processed image of said sequence, a base image of said sequence, a spatial luminance peaks and valleys map derived from said current image, and a vertical intensity gradient map derived from said current image.

17. A method comprising:
estimating features of a mouth in a current image of a sequence of digital images of a human face by deriving a deformable mouth model template, wherein deriving said deformable mouth model template includes:
minimizing an energy function to determine optimal transformation parameters of a transformation; and
transforming components of said deformable mouth model template by said transformation having said optimal transformation parameters,
wherein said energy function includes an elastic spline energy term to attract contours of said deformable mouth model template to respective parabolas,
wherein said energy function is a lips energy objective function and said elastic spline energy term is related to a square of a width of said mouth in a base image of said sequence.

18. A method comprising:
estimating features of a mouth in a current image of a sequence of digital images of a human face by deriving a deformable mouth model template, wherein deriving said deformable mouth model template includes:
minimizing an energy function to determine optimal tansformation parameters of a transformation; and
transforming components of said deformable mouth model template by said transformation having said optimal transformation parameters,
wherein said energy function includes a teeth gap energy term to describe vertical gaps between the upper teeth and lower teeth,
wherein said energy function is a teeth energy objective function and said teeth gap energy term also describes vertical edges of teeth and an absence of teeth in a cavity of said mouth.

19. A method comprising:
estimating features of a mouth in a current image of a sequence of digital images of a human face by deriving a deformable mouth model template. wherein deriving said deformable mouth model template includes:
minimizing an energy ftinction to determine optimal transformation parameters of a transformation; and
transforming components of said deformable mouth model template by said transformation having said optimal transformation parameters,
wherein said energy function includes a texture energy term to describe texture differences in lips and corners of said mouth compared to a different image of said sequence.

20. The method of claim 19, wherein said different image is a base image of said sequence.

21. The method of claim 19, wherein said different image is a previously processed image of said sequence.

22. A method comprising:
estimating features of a mouth in a current image of a sequence of digital images of a human face by deriving a deformable mouth model template, wherein deriving said deformable mouth model template includes:
minimizing an energy function to determine optimal transformation parameters of a transformation; and
transforming components of said deformable mouth model template by said transformation having said optimal transformation parameters,
wherein said energy function includes a corner energy term that attracts lip corners to an area having a particular vertical intensity gradient structure.

23. The method of claim 22, wherein said corner energy term includes a sum of products of a vertical intensity gradient and a kernel in a left corner of said mouth and in a right corner of said mouth.

24. The method of claim 22, wherein said corner energy term is zero for coarse transformations.

* * * * *